United States Patent
Truong et al.

(10) Patent No.: US 12,411,088 B2
(45) Date of Patent: Sep. 9, 2025

(54) OPTIMIZED PHOTON COLLECTION FOR LIGHT-SHEET MICROSCOPY

(71) Applicant: University of Southern California, Los Angeles, CA (US)

(72) Inventors: Thai Truong, Los Angeles, CA (US); Kevin Keomanee-Dizon, Los Angeles, CA (US); Scott E. Fraser, Los Angeles, CA (US)

(73) Assignee: University Of Southern California, Los Angeles, CA (US)

( * ) Notice: Subject to any disclaimer, the term of this patent is extended or adjusted under 35 U.S.C. 154(b) by 485 days.

(21) Appl. No.: 17/910,305

(22) PCT Filed: Mar. 12, 2021

(86) PCT No.: PCT/US2021/022198
§ 371 (c)(1),
(2) Date: Sep. 8, 2022

(87) PCT Pub. No.: WO2021/183945
PCT Pub. Date: Sep. 16, 2021

(65) Prior Publication Data
US 2023/0138764 A1 May 4, 2023

Related U.S. Application Data

(60) Provisional application No. 62/989,344, filed on Mar. 13, 2020.

(51) Int. Cl.
*G02B 21/00* (2006.01)
*G01N 21/64* (2006.01)
(Continued)

(52) U.S. Cl.
CPC ..... *G01N 21/6458* (2013.01); *G02B 21/0032* (2013.01); *G02B 21/0076* (2013.01); *G02B 21/248* (2013.01); *G02B 21/367* (2013.01)

(58) Field of Classification Search
CPC .......... G01N 21/6458; G01N 21/6456; G01N 2021/6463; G01N 21/6486;
(Continued)

(56) References Cited

U.S. PATENT DOCUMENTS

| | | |
|---|---|---|
| 2011/0134521 A1 | 6/2011 | Truong et al. |
| 2015/0022881 A1 | 1/2015 | Loza Alvarez et al. |

(Continued)

FOREIGN PATENT DOCUMENTS

| | | | | |
|---|---|---|---|---|
| CN | 111258045 A | * | 6/2020 | ......... G01N 21/6458 |
| JP | 2018045148 A | * | 3/2018 | |

(Continued)

OTHER PUBLICATIONS

International Search Report and Written Opinion for PCT/US2021/022198 dated Jun. 9, 2021, 12 pages.
(Continued)

*Primary Examiner* — Arnel C Lavarias
(74) *Attorney, Agent, or Firm* — NIXON PEABODY LLP

(57) ABSTRACT

Systems and methods are provided for increasing photon collection during imaging with a light-sheet fluorescence microscope. In one example, one or more adaptive optical elements may be positioned in a detection light path between a detection objective and an imaging sensor. A depth of field of the detection objective is adjusted as a function of a thickness of an excitation light-sheet used to illuminate a sample during imaging. As a result, the detection objective captures more fluorescence photons generated by light-sheet excitation.

33 Claims, 12 Drawing Sheets

(51) Int. Cl.
*G02B 21/24* (2006.01)
*G02B 21/36* (2006.01)

(58) Field of Classification Search
CPC ............ G02B 21/0032; G02B 21/0076; G02B 21/248; G02B 21/367; G02B 27/0025; G02B 27/0068; G02B 27/0075; G02B 21/00; G02B 21/0004; G02B 21/002; G02B 21/0036; G02B 21/0052; G02B 21/006; G02B 21/0064; G02B 21/0072; G02B 21/008; G02B 21/06; G02B 21/18; G02B 21/36; G02B 21/361
USPC ....... 359/374, 362, 363, 368, 369, 372, 385, 359/390, 391, 392, 434
See application file for complete search history.

(56) References Cited

U.S. PATENT DOCUMENTS

| | | | |
|---|---|---|---|
| 2015/0177506 A1* | 6/2015 | Nishiwaki | G02B 21/367 348/46 |
| 2016/0154236 A1 | 6/2016 | Siebenmorgen et al. | |
| 2018/0292321 A1 | 10/2018 | Fiolka et al. | |
| 2019/0056581 A1* | 2/2019 | Tomer | G02B 21/0076 |
| 2019/0162943 A1 | 5/2019 | Taniguchi et al. | |
| 2019/0199969 A1 | 6/2019 | Betzig et al. | |
| 2020/0049968 A1 | 2/2020 | Fiolka et al. | |

FOREIGN PATENT DOCUMENTS

| | | |
|---|---|---|
| WO | 2017075275 A1 | 5/2017 |
| WO | 2020001938 A | 1/2020 |
| WO | 2021183945 A1 | 9/2021 |

OTHER PUBLICATIONS

IPRP for PCT/US2021/022198 dated Sep. 6, 2022, 10 pages.
Extended European Search Report in European Patent Application No. 21767483.7, mailed Apr. 3, 2024 (9 pages).
Notice of Reasons for Rejection in Japanese Patent Applicaion No. 2022554772 with English Translation, mailed Feb. 25, 2025 (8 pages).
Olarte et al. "Light-sheet microscopy: a tutorial." Advances in Optics and Photonics, vol. 10.1 (2018): 111-179.

* cited by examiner

OPTIMIZED PHOTON COLLECTION FOR LIGHT-SHEET MICROSCOPY

CROSS REFERENCE TO RELATED APPLICATIONS

This application is a National Phase of International Application No. PCT/US2021/022198, filed Mar. 12, 2021, which designated the U.S. and that International Application was published under PCT Article 21 (2) in English, which claims priority to and benefit of U.S. provisional patent application No. 62/989,344, filed Mar. 13, 2020, the entirety of which is hereby incorporated by reference.

STATEMENT REGARDING FEDERALLY SPONSORED RESEARCH OR DEVELOPMENT

This invention was made with government support under Grant No. MH107238 awarded by National Institutes of Health. The government has certain rights in the invention.

FIELD

The present description is directed to light-sheet microscopy.

BACKGROUND

The following description includes information that may be useful in understanding the present invention. It is not an admission that any of the information provided herein is prior art or relevant to the presently claimed invention, or that any publication specifically or implicitly referenced is prior art.

From molecules to a cellular function, or from a collection of cells to an organism, the most striking phenomena of life emerges from spatially complex, dynamic interactions among millions of components over time. Optical imaging of such dynamics is needed to advance the fundamental understanding of their interrelationships and by extension, the treatment of human disease but is challenged by the multiple spatial, temporal, and energetic scales in which they take place. Various imaging approaches, such as light-sheet microscopy, have been utilized to image various cellular, molecular, and/or tissue level dynamics.

SUMMARY

In imaging the various dynamics with light-sheet microscopy, photon flux from the specimen sets a fundamental limit on temporal resolution. For example, even an ideal detector with infinite speed and zero noise must wait for enough photoelectrons to form an image with an acceptable signal-to-noise ratio (SNR). Further, photo damage sets the budget on a number of photon signals that can be captured from the specimen. Increasing the excitation intensity above a specimen's photo damage threshold (that is, a maximum tolerable excitation dosage) will not yield more useful signal but will induce unwanted photo bleaching and toxicity. Thus, in general, a high numerical aperture (NA) objective lens is employed for detection in light-sheet microscopy in order to increase spatial resolution as well as light collection for improving SNR while reducing photo damage to living specimens.

The inventors herein have identified various disadvantages with the above approach. As an example, a high NA objective has a short depth-of-field (DOF), since the DOF is inversely proportional to the NA squared. While high NA of the objective provides intrinsically high axial resolution, when imaging across large scale tissue volumes that are on the order of hundreds of cubic microns, such high axial resolution is not needed. Further, when imaging across such large scale tissue volumes, an elongated focused beam that spans hundreds of microns in a direction of propagation is scanned to rapidly achieve a large field of view. Owing to diffraction, such a focus generates an excitation light-sheet that has a thickness of several microns or more. While the high NA of the objective is sufficiently thin to optically section and Nyquist sample at single-cell resolution, much of the light-sheet FWHM thickness lies beyond the detection DOF of the high NA objective. As a result, fluorescence signal photons generated by illumination outside the DOF of the detection objective are lost or show up as low-contrast background that corrupts the recorded image. Consequently, achievable SNR, useful contrast and imaging speed are greatly compromised.

The inventors herein developed systems and methods to at least partially address some of the above-mentioned problems. Accordingly, in one example, a method for a light-sheet microscope, comprises: illuminating a sample with an excitation light-sheet; adjusting a depth of field (DOF) of a detection objective according to a measure of a thickness of the excitation light-sheet; receiving, at an imaging sensor, fluorescence signal data via the detection objective; and generating an image of the sample according to the fluorescence signal data. In this way, by adjusting the DOF of the detection objective according to the light-sheet thickness, a greater amount of fluorescence signal photons are captured, thereby increasing SNR, contrast, and imaging speed.

As one example, a light-sheet microscope includes an excitation light source and focusing optics configured to illuminate a sample with an excitation light-sheet having a full-width at half-maximum (FWHM) thickness, wherein the FWHM is a measure over which an intensity of the light-sheet intensity is at 50% of a maximum intensity. The light-sheet microscope further includes a detection system including a detection objective positioned such that an optical axis of the detection objective is substantially perpendicular to the excitation light-sheet. The detection system further includes at least one adaptive optical element that may be positioned at, or close to, any conjugate plane of the detection objective or one or more optics in the detection system. During imaging, the at least one adaptive optical element may adjust a DOF of the detection objective to be equal to or greater than the FWHM thickness of the light-sheet. As a result, signal photons that would otherwise be wasted are captured by the objective. Recorded signal photons in a detection light path propagate to an imaging detector, which registers the signal photons simultaneously with a two-dimensional (2D) array of light sensitive elements, capturing an image of the entire FWHM thickness in one shot.

In this way, by adjusting the DOF according to the excitation light-sheet thickness, a fundamental tradeoff and oft overlooked challenge in light-sheet microscopy between the thin DOF of high-NA detection optics and the thicker light-sheets inherent to large field-of-view excitation beams is overcome. In particular, by adjusting the DOF of the detection objective so that it is comparable to or greater than the thickness of the excitation light-sheet, signal photons collected are instantaneously increased, thereby providing higher SNR and contrast. Further, by extending the DOF, shorter exposures are required to produce images with a desired SNR, which increases the volumetric imaging speed.

Furthermore, reduced illumination doses are required to record images with the desired SNR, which decreases rates of photo bleaching and photo damage to the specimen.

Furthermore, by adjusting the DOF as a function of light-sheet thickness, unwise extension of DOF is controlled, which improves SNR. Further, axial resolution is largely preserved while greatly increasing photon collection, acquisition speed, and contrast.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

Figure 1:
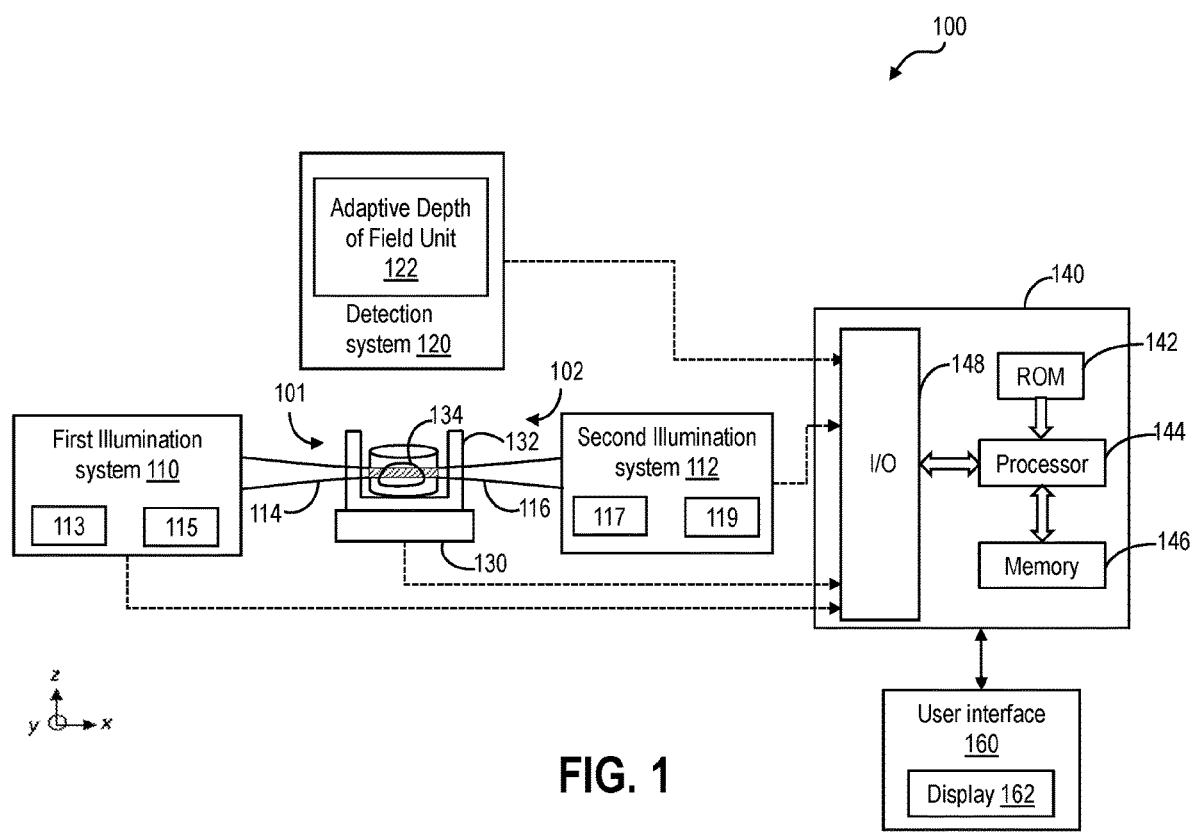
FIG. 1 shows an example overview of a light-sheet microscope, according to an embodiment of the disclosure.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced.

DETAILED DESCRIPTION

Unless defined otherwise, technical and scientific terms used herein have the same meaning as commonly understood by one of ordinary skill in the art to which this invention belongs. Szycher's Dictionary of Medical Devices CRC Press, 1995, may provide useful guidance to many of the terms and phrases used herein. One skilled in the art will recognize many methods and materials similar or equivalent to those described herein, which could be used in the practice of the present invention. Indeed, the present invention is in no way limited to the methods and materials specifically described.

In some embodiments, properties such as dimensions, shapes, relative positions, and so forth, used to describe and claim certain embodiments of the invention are to be understood as being modified by the term "about." As used herein the term "about" when used in connection with a referenced numeric indication means the referenced numeric indication plus or minus up to 5% of that referenced numeric indication, unless otherwise specifically provided for herein. For example, the language "about 50%" covers the range of 45% to 55%. In various embodiments, the term "about" when used in connection with a referenced numeric indication can mean the referenced numeric indication plus or minus up to 4%, 3%, 2%, or 1% of that referenced numeric indication, if specifically provided for in the claims.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Overview

Figure 9:
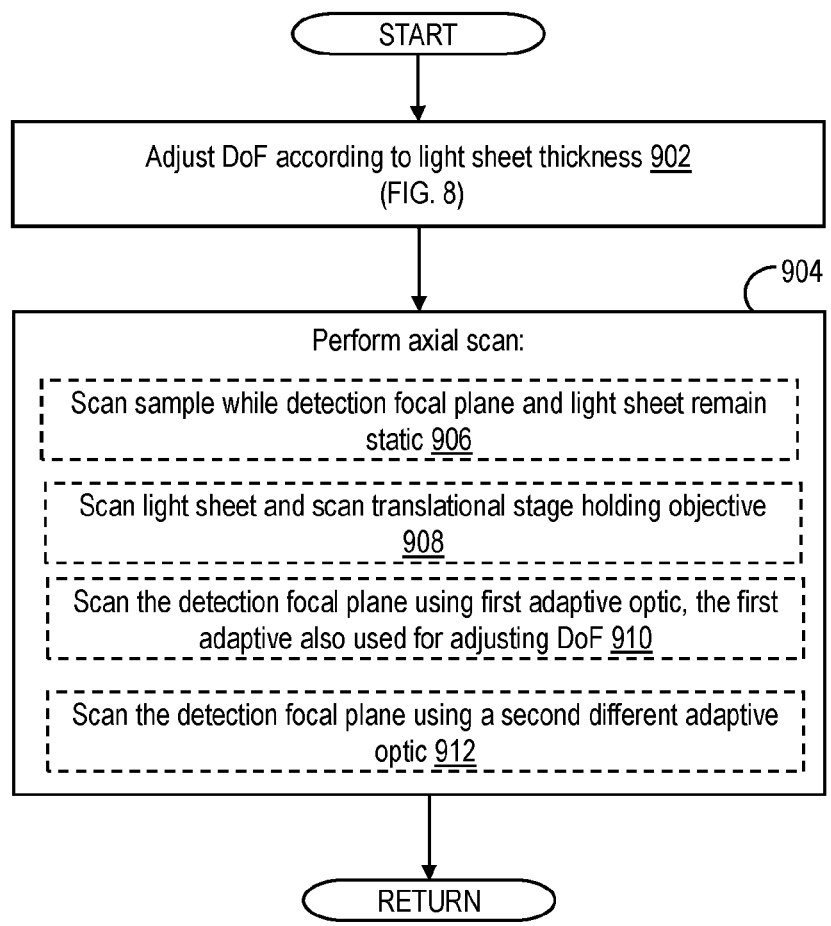
FIG. 9 shows a flow chart depicting an example method for performing z-scan with a light-sheet microscope, according to an embodiment of the disclosure.
Figure 10A:
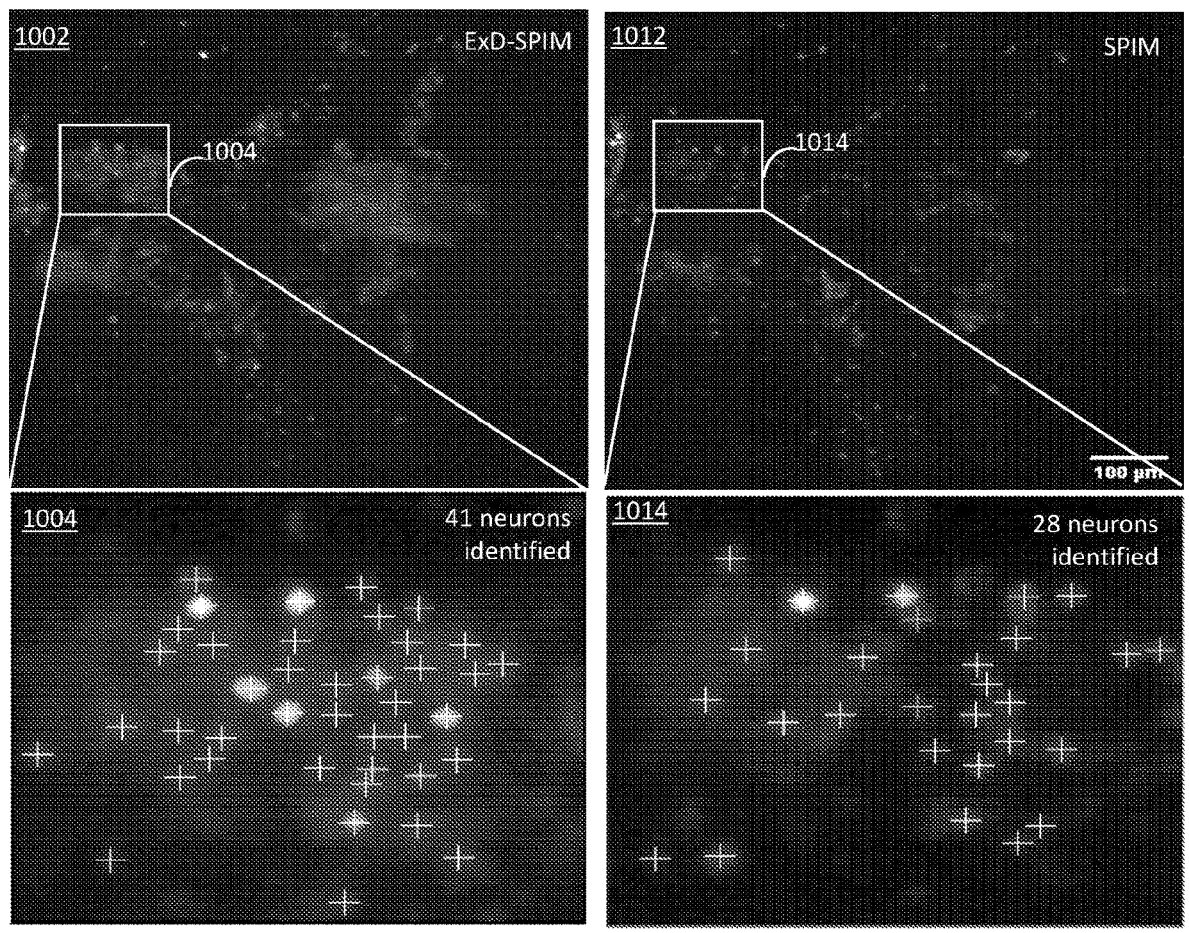
FIGS. 10A and 10B show an example light-sheet microscope image and corresponding signal intensity graph respectively, according to an embodiment of the disclosure.
Figure 10B:
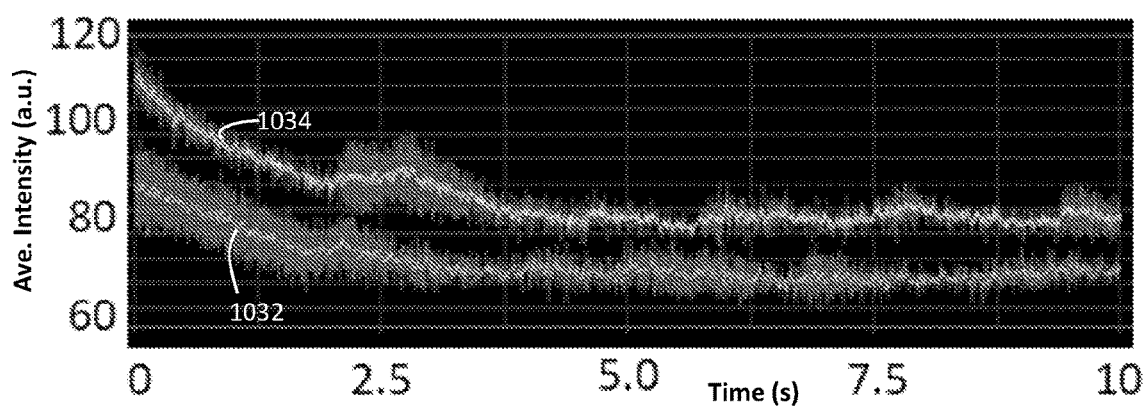
Figure 11:
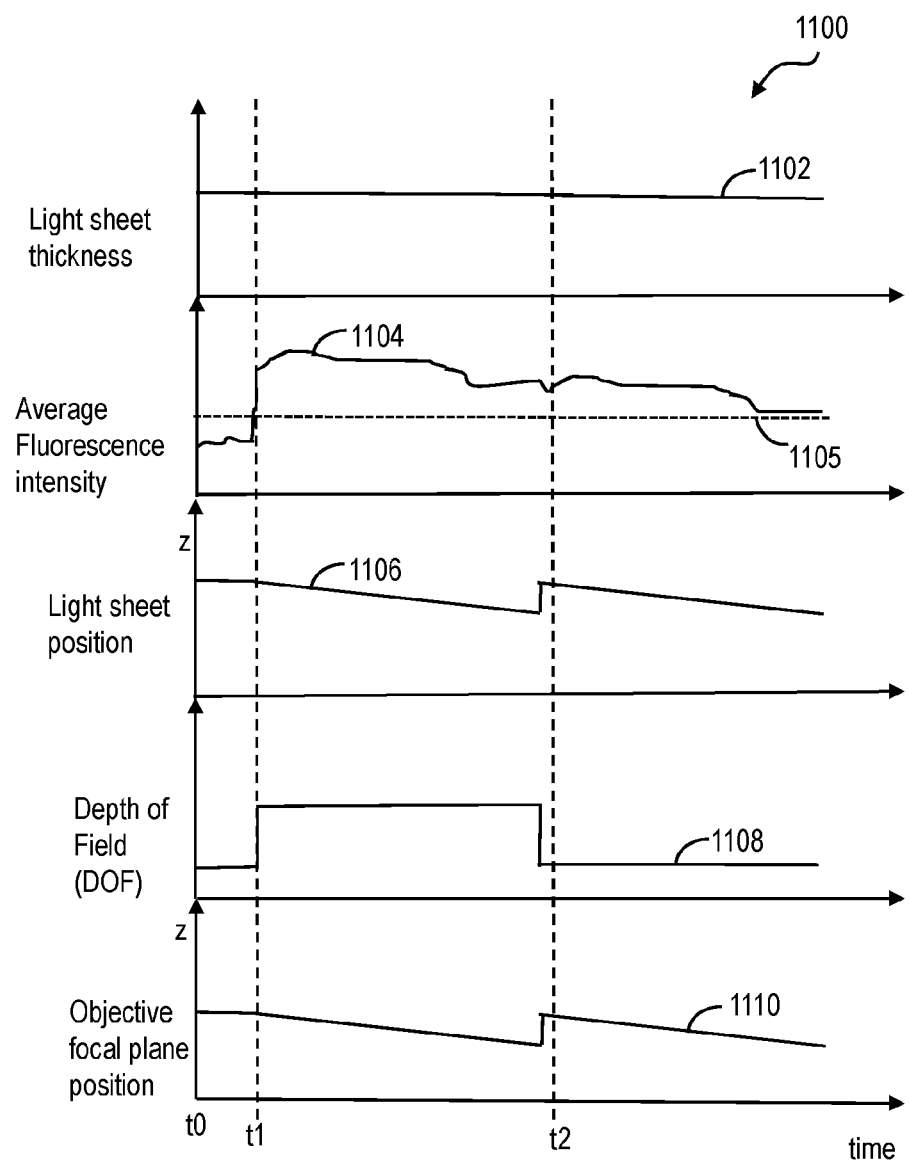
FIG. 11 shows an example depth of field adjustment during a z-scan, according to an embodiment of the disclosure.

The present description relates to systems and methods for improving photon collection in Light-Sheet Fluorescence Microscopy (LSFM), also referred to as Single (or Selective) Plane Illumination Microscopy (SPIM). In particular, the present description relates to systems and methods for adjusting at least one detection objective of a light-sheet microscope for increasing fluorescence photon signal collection. An example overview of a light-sheet microscope system is shown at FIG. 1. When a high NA objective is implemented for light-sheet microscopy, due to the detection objective's low depth of field (DOF), fluorescence photons from the sample that lie outside the DOF of the objective are corrupted and/or lost, resulting in low signal intensity. Further in order to acquire sufficient amount of photons, a duration of light-sheet excitation may be increased, which may induce photo-toxicity and/or cause photo-bleaching. Furthermore, imaging speed is reduced. In order to improve photon collection by the high NA objective and improve acquisition of fluorescence signals resulting from light-sheet excitation, the DOF of the objective is extended. In particular, the DOF of the detection objective is extended according to a measure of thickness of the light-sheet so as to ensure that the detection objective captures a greater amount of the fluorescence photons from the sample. Accordingly, various embodiments of a detection system that may be utilized to adjust the DOF of the detection objective are discussed at FIGS. 2-5. In particular, one or more adaptive optical elements may be positioned in a detection light path from a back focal plane of the detection objective to an imaging sensor. During imaging, the one or more adaptive optical elements may be adjusted to increase the DOF of the detection objective according to the light-sheet thickness. A schematic illustration of an intensity profile of the excitation light-sheet and a detection DOF extension for improving photon collection by the objective is shown at FIG. 6A. Further, a graphical illustration of increase in photon signal acquisition by the detection objective when the DOF is adjusted according to the light-sheet thickness is shown at FIG. 6B. Example methods for operating a light-sheet microscope with DOF adjustment are described at FIGS. 7-9. Example experimental data showing increase in detection efficiency by DOF adjustment as a function of light-sheet thickness is shown at FIGS. 10A and 10B. FIG. 11 shows a prophetic example of DOF adjustment during volumetric multi-color imaging.

Technical advantages of adjusting a DOF of a detection objective according to light-sheet thickness include increased photon acquisition by the detection objective and increased SNR of the fluorescence image. Another technical advantage is improvement in image quality when imaging large sample volumes. A further technical advantage is increase in acquisition speed for large sample volumes. Yet another technical advantage is increase in fluorescence image contrast, and reduction in loss of photon signals. Further, the systems and methods described herein can be implemented with various types of light-sheet microscopy, such as multi-directional light-sheet microscopy, collinear light-sheet microscopy, etc., thereby providing increased adaptability and scalability. Taken together, the systems and methods described herein for detection objective DOF adjustment as a function of light-sheet thickness provide significant improvement in light-sheet microscopy.

Light-Sheet Microscope System

FIG. 1 shows a high-level block diagram of an example configuration of a light microscope 100 used for optical imaging of a biological sample 134 (hereinafter referred to as sample 134 or specimen). The microscope 100 includes a first illumination system 110 and a second illumination system 112 for illuminating the sample from opposite directions. In particular, the sample 134 is illuminated from each side 101 and 102 such that a first light-sheet 114 from the first illumination system 110 and a second light-sheet 116 from the second illumination system 112 pass through the sample illuminating a section or a slice (shown by cross hatching) of the sample 134. For example, the section may be a thin section (e.g., 5-6 μm wide) along the z-axis.

Further, the first excitation light-sheet 114 and the second excitation light-sheet 116 may illuminate the specimen 134 such that there is spatial and temporal overlap between the light-sheets 114 and 116. For example, the first light-sheet and the second light-sheet may illuminate a same illumination plane (that is, a plane illuminated by a light-sheet) at the same time for a same time duration.

As used herein, a light-sheet refers to a sheet of light generated by an illumination system such that the light-sheet passes through a plane of a sample, thereby illuminating the plane of the sample. The light-sheet is used to optically slice the sample.

Each of the first and second illumination systems 112 and 114 may include a light source 113 and 117 respectively for generating light that is used for forming corresponding light-sheets 114 and 116. The light source may be based at least on a type of excitation provided for light-sheet microscopy, for example linear excitation or non-linear excitation. When, linear excitation is utilized, a signal intensity is proportional to an excitation light intensity. Example implementations of linear excitation include one-photon-excited fluorescence, elastic light scattering, and inelastic light scattering (e.g., Raman or Brillouin). When non-linear excitation is implemented, a signal intensity is proportional to a second (or third) power of an excitation light intensity, in which the sample interacts with two (or three) photons near-simultaneously. Example implementations of non-linear excitation include two-photon-excited fluorescence, second-harmonic generation, three-photon-excited fluorescence, and other higher-order processes. The excitation light-sheets may be created either by a simple cylindrical lens, or by scanning a beam, such as one with a Gaussian beam profile, generated via a low NA objective lens, with galvanometer or resonant scanners.

In one example, each of the light sources 113 and 117 may be a laser light source emitting a narrow-band excitation wavelength (e.g., 405 nm, 488 nm, 561 nm, 635 nm, 960 nm, etc.). In some examples, the narrow-band excitation wavelength may be generated by light emitting diodes (LEDs). In another example, the light sources 113 and 117 may be broadband sources (e.g., an incandescent source, an arc source, broad-band LEDs, etc.) generating broad-spectrum light wavelengths. In yet another example, one or more portions of the excitation wavelength may be outside of the visible range. In one example, each light source 113 and 117 may be a same type of light source emitting same excitation light wavelength (e.g., where each light source is a laser light source emitting a desired excitation wavelength, such as 488 nm). In another example, each light source 113 and 117 may be same type of light source but may emit different excitation light wavelengths (e.g., where each light source is a laser light source but emitting different wavelengths, such as 488 nm and 560 nm). In yet another example, each light source 113 and 117 may be different (e.g., laser and LED).

Each illumination system 110 and 112 further includes illumination optics 115 and 119 for generating corresponding light-sheets 114 and 116. In one example, the light-sheets 114 and/or 116 may be formed statically. Accordingly, the illumination system may include one or more cylindrical lens (not shown) and a low numerical aperture illumination objective (not shown) for focusing the light-sheet on an illumination plane within the sample 134. In another example, the light-sheets 114 and/or 116 may be formed by rapidly scanning a focused illumination beam along the illumination plane. Accordingly, the illumination optics 115 and/or 119 may include one or more galvanometer mirrors (not shown) for generating one or more light-sheets. Further, in some examples, the illumination optics 115 and/or 119 may include one or more beam shaping optics, such as spatial light modulator (SLM), lenses, mirrors, and/or diffraction gratings, for generating desired beam profiles at the illumination plane.

While FIG. 1 shows two illumination systems, in some examples, a single illumination system may be utilized. In some examples, illumination systems 110 and/or 112 may be configured to generate multiple light-sheets, slightly rotated from each other, for multi-directional illumination.

The light-sheet microscope 100 includes a stage 130 comprising a sample holder 132 for mounting the specimen 134. The stage 130 may be an electrically actuated stage movable along the z-axis. The stage 130 may be used to move the specimen 134 along z-axis in order to adjust a position of the light-sheets 114 and 116 within the specimen 134. The movement of the stage 130 may be adjusted by a controller 140. For example, the controller 140 may provide actuation signals to the stage 130 to move the stage along the z-axis.

The light-sheet microscope 100 includes a detection system 120 positioned along z-axis for detecting florescence emitted from the specimen 134. In particular, the detection system 120 includes a detection objective (not shown) and an optical axis of the detection objective may be substantially perpendicular to an illumination optical axis of an illumination objective of each illumination system 110 and 112. As used herein, substantially perpendicular may account for an error in setting the detection system with respect to the illumination systems and/or a manufacturing error. In one example, the fluorescence may be emitted in response to excitation of one or more fluorescent labels within the specimen 134. For example, the specimen 134 may include one or more fluorescent labels that emit fluorescence corresponding to an emission wavelength upon excitation by a light source, that is, light-sheets 114 and 116 in this example. As a non-limiting example, when a specimen labelled with green fluorescent protein (GFP) is exposed to a light-sheet generated by a laser outputting an excitation wavelength of 488 nm, the GFP emits florescence centered around 520 nm, which is detected by the detection system 120. As discussed above, the excitation may be linear or multi-photon (e.g., two-photon excitation). In some examples, the detection system may detect native proteins and/or molecules within the specimen 134 that emit light of specific wavelengths in response to excitation with the light-sheets 114 and 116.

Exemplary fluorescent labeling reagents include, but are not limited to, Hydroxycoumarin, Succinimidyl ester, Aminocoumarin, Methoxycoumarin, Cascade Blue, Hydrazide, Pacific Blue, Maleimide, Pacific Orange, Lucifer yellow, NBD, NBD-X, R-Phycoerythrin (PE), a PE-Cy5 conjugate (Cychrome, R670, Tri-Color, Quantum Red), a PE-Cy7 conjugate, Red 613, PE-Texas Red, PerCP, Peridinin chlorphyll protein, TruRed (PerCP-Cy5.5 conjugate), FluorX, Fluoresceinisothyocyanate (FITC), BODIPY-FL, TRITC, X-Rhodamine (XRITC), Lissamine Rhodamine B, Texas Red, Allophycocyanin (APC), an APC-Cy7 conjugate, Alexa Fluor 350, Alexa Fluor 405, Alexa Fluor 430, Alexa Fluor 488, Alexa Fluor 500, Alexa Fluor 514, Alexa Fluor 532, Alexa Fluor 546, Alexa Fluor 555, Alexa Fluor 568, Alexa Fluor 594, Alexa Fluor 610, Alexa Fluor 633, Alexa Fluor 647, Alexa Fluor 660, Alexa Fluor 680, Alexa Fluor 700, Alexa Fluor 750, Alexa Fluor 790, Cy2, Cy3, Cy3B, Cy3.5, Cy5, Cy5.5 or Cy7.

The detection system 120 includes an adaptive depth of field unit 122 configured to adjust a depth of field of the detection objective. The adaptive depth of field unit may include a plurality of optical elements and at least one adaptive optical element that may be used to adjust a depth of field of the detection objective. As discussed above, due to intrinsically high numerical aperture (NA) of the detection objective a depth of field of the detection objective is short (e.g., 1 µm). When large tissue volumes are imaged using light-sheet microscopy, an excitation light-sheet spanning several hundreds of microns in a propagation direction of an illumination beam (that is, along x-axis in the examples discussed herein) is generated to obtain a large field-of-view. Due to diffraction, the excitation light-sheet may have a full-width at half-maximum (FWHM) thickness of several times greater than a width of the light-sheet at peak intensity. As used herein, FWHM thickness is a measure of thickness (along z-axis, that is, the detection optical axis) over which a light-sheet intensity is at 50% of a maximum intensity. Thus, the FWHM thickness of the light-sheet may be used to quantify a range along the detection axis over that includes a significant portion of a total fluorescence. When the objective with depth of field (DOF) less than the FWHM thickness, fluorescence signal from outside the DOF are lost and/or corrupted. As a result, signal to noise ratio, useful contrast, and imaging speed is reduced.

The inventors herein have identified the above-mentioned issues and have developed systems and methods for light-sheet microscopy that at least partially address the above-mentioned issues. In one example, fluorescence signal captured by the detection system 120 may be increased by using the adaptive depth of field unit 122 to adjust a DOF of the detection objective according to a thickness of the light-sheet. For example, the DOF may be adjusted to be greater than or equal to the thickness of the light-sheet. As a non-limiting example, the DOF may be adjusted to be greater than or equal to the FWHM thickness of the light-sheet. In some examples, a different measure of thickness, such as $1/e^2$ width, may be used and may be based on a type of light-sheet (e.g., Gaussian beam discussed below). FWHM and $1/e^2$ width are examples of the measure of thickness of light-sheet, it will be appreciated that any measure of thickness of thickness of the light-sheet may be utilized for DOF adjustment. In some other examples, the DOF may be adjusted according to a percentage of thickness of the light-sheet. Details of adjustment of DOF based on the light-sheet thickness will be described below, particularly, at FIG. 8.

In one example, the light-sheets 114 and 116 may be Gaussian light-sheets (also referred to as Gaussian beams). A Gaussian light-sheet has a Gaussian profile, wherein an intensity profile of the light-sheet has a peak and decays monotonically according to a Gaussian distribution from the peak. Thus, the intensity profile of a Gaussian light-sheet on the x-z plane shows a main lobe and multiple weak side lobes. Further, when viewed on an x-z plane, the Gaussian light-sheet has a thin waist; however, a distance along x axis through which the Gaussian light-sheet remains thin is short due to diffraction. In some examples, the illumination systems 112 and 114 may be configured to generate propagation-invariant light-sheets, where a thickness of the light-sheet remains constant for a greater distance along the x-axis. Example propagation in-variant beams include, but not limited to, Bessel-Gauss beams, Bessel beam lattice, Airy-Gauss beams, Spherically aberrated beams, and Double beams. Intensity profiles of the propagation invariant beams show multiple lobes, wherein the intensity of the side lobes do not decay monotonically from the main lobe. Further, a main lobe of a propagation invariant beam may be thinner compared to Gaussian beams. Thus, intensity is distributed to a greater extent in the side lobes of a propagation invariant beam compared to Gaussian beams. Due to the different intensity profiles of the different types of light-sheets, in order to increase photon acquisition by a detection objective, a measure of thickness of the light-sheet that is utilized for adjusting a depth of field (DOF) of the detection objective may be based on a type of light-sheet. For example, when Gaussian beams are utilized the measure of thickness of the light-sheet may be a full-width at half-maximum (FWHM) based on an intensity profile of the Gaussian beam. If other types of beams, such as Bessel beams, airy beams, etc., are used that have greater intensity distribution within the side lobes, a different measure of thickness, such as a thickness based on a number of side lobes, may be used. That is, in addition to thickness of main lobe, one or more side lobes may be taken into account for determining an amount of DOF extension.

In some embodiments, a percentage of thickness of a given light sheet that is used for illuminating the sample may be used to determine an amount of DOF adjustment. For example, the DOF may be adjusted to cover anywhere between a first percentage covered by intrinsic DOF of the objective to 100% of the thickness of the light-sheet along the z-axis. The first percentage covered by the intrinsic DOF of the objective may be based on a numerical aperture of the objective used. As a non-limiting example, the first percentage may be 20% of the thickness of the given light-sheet. In some examples, the DOF may be adjusted to be image a threshold distance (along the z-axis) that is greater than the 100% of the thickness of the light-sheet. The threshold distance may be based on a threshold signal to noise ratio. In one example, as the signal to noise ratio decreases below thresholds signal to noise ratio, the DOF adjustment may not be performed. Accordingly, in one example, the controller 140 may monitor the signal to noise ratio during DOF adjustment, and responsive to the signal to noise ratio decreasing below the threshold, the controller 140 may send signals to the adaptive DOF adjustment unit 122 to stop any further extension of the DOF.

In some embodiments, the excitation light-sheet is dynamically changing its thickness, and the adaptive DOF adjustment unit 122 is configured to adjust to a static depth of field that encompasses a full changing range of the light-sheet thickness.

In some embodiments, the excitation light-sheet is dynamically changing its thickness, and the adaptive DOF adjustment unit 12 is configured to adjust to a dynamically changing depth of field, matching the changing thickness of the excitation light-sheet.

The adaptive DOF unit 122 may adjust the DOF of the detection objective according to the light-sheet thickness, according to one or more signals from the controller 140. For example, the controller 140 may receive an indication of light-sheet thickness from one or more of a first illumination system 110, a second illumination system 112, and the detection system 120. For example, the controller 140 may receive signals from one or more of the illumination systems 110 and 112 indicating a generated (or excepted) light-sheet thickness, and/or a fluorescence intensity signal from the detection system indicating an actual light-sheet thickness. The controller 140 may be further configured to respond to the indication of light-sheet thickness. For example, the controller 140 may send signals to one or more actuators of the adaptive DOF unit 122 to adjust one or more adaptive optical elements (e.g., a deformable mirror) to adjust the DOF of the objective according to the light-sheet thickness based on the received signals. The various optical elements of the detection system 120, including the adaptive DOF unit 122, will be described with respect to FIGS. 2-5 below.

The controller 140 may include at least one processor (CPU) 144 and memory such as read-only memory ROM 146 and/or random-access memory RAM 142, which comprise computer-readable media that may be operatively coupled to the processor. Thus, one or more of ROM 146 and RAM 142 may include system instructions that, when executed by the processor performs one or more of the operations described herein, such as the process flow of subsequent figures. Processor 144 can receive one or more input signals from various sensory components and can output one or more control signals to the various control components described herein via input/output (I/O) interface 148. In some examples, one or more of the various components of controller 144 can communicate via a data bus. The present example shows an example configuration of the controller 140, it will be appreciated that the controller 140 may be implemented with other configurations.

The controller 140 may provide synchronized control of all opto-mechanical components within the microscope 100. For example, the controller 140 may rapidly perform optical alignment between the light-sheet and the objective on the specimen 134, and enable simultaneous image acquisition with a plurality of detectors (or cameras) within the detection system 120.

Detection System Configurations

Figure 2:
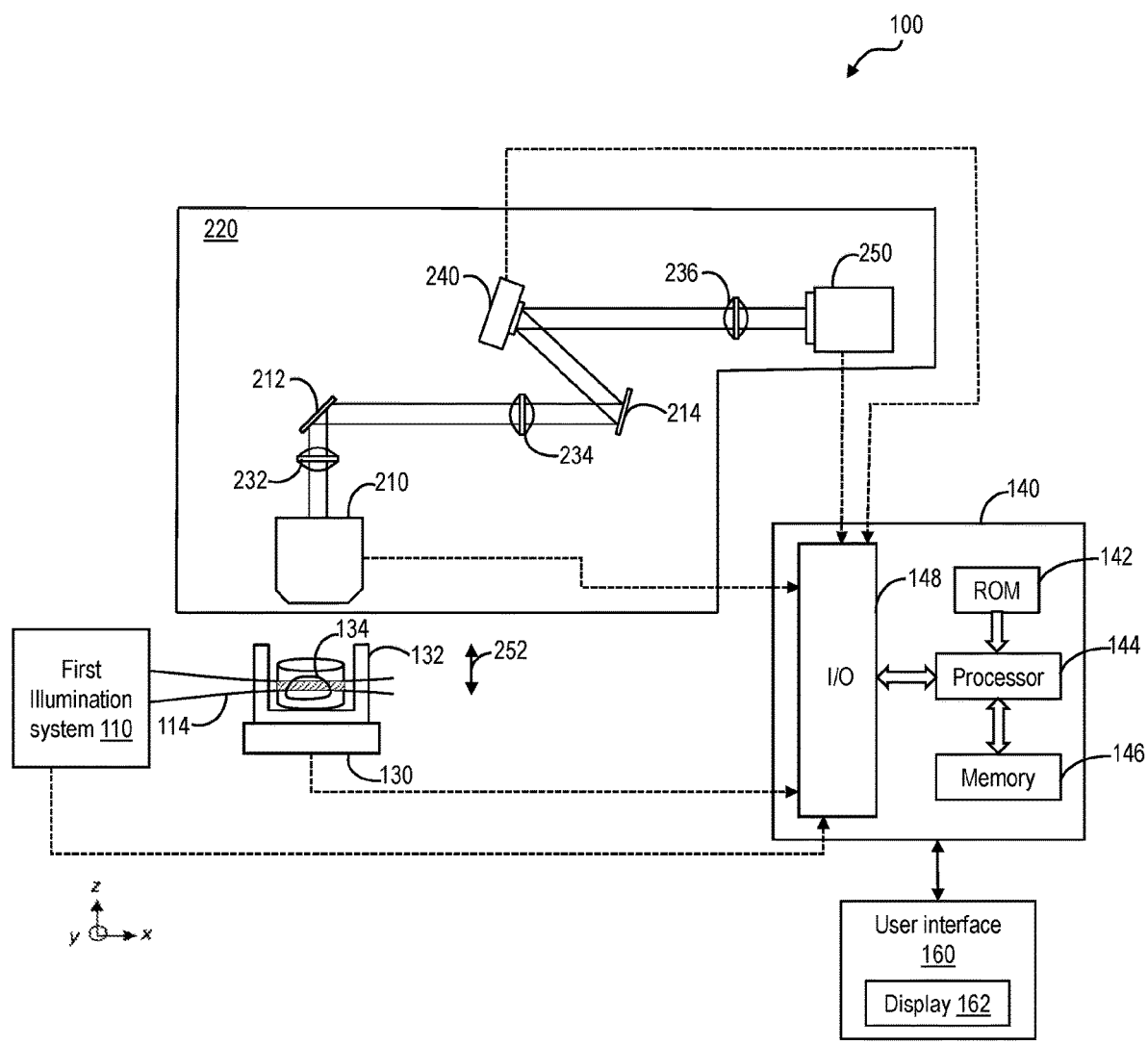
FIG. 2 shows a schematic depiction of a detection system of an example light-sheet microscope, such as the light-sheet microscope of FIG. 1, according to an embodiment of the disclosure.

FIGS. 2-5 show various embodiments of the detection system 120. Turning to FIG. 2, it shows a schematic diagram of a detection system 220 according to a first embodiment of the disclosure. The detection system 220 may be an example of the detection system 120. In the FIGS. 2-5, similar elements and/or components are numbered similarly, and the description of similarly numbered elements and/or components will not be repeated for the sake of brevity. Further, FIGS. 2-5 are shown including only the first illumination system, and described with respect to the first illumination system 110 and a first light-sheet 114 generated via the illumination system 110. It will be appreciated that the various embodiments of the detection system of the light-sheet microscope described below can be implemented in microscopes with two illumination systems without departing from the scope of the disclosure.

The detection system 220 includes a detection objective 210 having an optical axis substantially perpendicular to respective optical axis of the illumination system 110. The detection system 220 further includes an adaptive optical element 240 for adjusting a DOF of the objective 210 and an imaging sensor 250 (e.g., CMOS (complementary metal oxide semiconductor) image sensors, or scientific-CMOS (sCMOS sensors)) for capturing fluorescence data collected by the objective. Other imaging sensors that may be used include but not limited to charge coupled device (CCD) camera and electron multiplying charge coupled device camera (EMCCD). The imaging sensor 250 may be communicatively coupled (e.g., via a wired and/or wireless connection) to the controller 140 and image data from the imaging sensor 250 may be processed via the controller 140 and displayed in real-time or near real-time via a display portion 162 of a user interface 160 communicatively coupled to the controller.

The detection system also includes one or more lenses 232, 234, and 236, and one or more mirrors 212 and 214 in a detection light path from the objective 210 to the imaging sensor 250. In particular, the detection light path is configured to image a back aperture (that is, pupil plane or Fourier plane) of the detection objective, via a 4f arrangement using lenses 232 and 234 onto the adaptive optical element 240. In some embodiments, the adaptive optical element 240 may be positioned in any conjugate plane of the objective. For example, the adaptive optical element may be positioned at a conjugate plane of lens 232 or at a conjugate plane of lens 236.

In one example, a position of the adaptive optical element is not exactly at a pupil plane, but at a small distance away from the pupil plane, and where small distance from the pupil plane is small enough so that the overall performance of the entire optical setup is still within certain specifications and or still correctable with image processing.

In another example, the adaptive optical element is positioned at or near a conjugate plane of the detection objective or at or near a respective conjugate plane of the one or more optical elements. As used herein, "near a conjugate plane" or "near a respective conjugate plane" refers to a position of the adaptive optical element that is not exactly at a conjugate plane of a pupil plane of the objective or respective conjugate plane of the one or more optical elements, but at a small distance away, and where a deviated distance from the conjugate plane of the objective or respective conjugate plane of the one or more optical elements is small enough so that the overall performance of the entire optical setup is still within certain specifications and or still correctable with image processing.

The adaptive optical element 240 may be a dynamic optical element or a static adaptive optical element, or a combination thereof. Further, one or more adaptive optical elements may be utilized.

In one example, the adaptive optical element 240 may be a dynamic optical element, such as a deformable mirror or a spatial light modulator. When a deformable mirror is used, a curvature of the deformable mirror is adjusted to obtain a desired DOF. In particular, a curvature of the deformable mirror is adjusted according to a measure of light-sheet thickness (e.g. FWHM) such that the objective DOF is greater than or equal to the measure of the light-sheet thickness. The deformable mirror may include a plurality of actuators for adjusting the curvature of the deformable mirror. For example, the controller 140 may receive an indication of light-sheet thickness from one or more of the illumination system 110, detection system 220, and user input (e.g., information regarding the sample, such as embedding medium, cover slip based positioning, etc.). The controller 140 may actuate a selected number of actuators of the deformable mirror to adjust the curvature of the deformable mirror based on the indication of the light-sheet thickness, and thereby adjust the DOF of the objective according to the measure of the light-sheet thickness. In one example, as the measure of the light-sheet thickness increases, the deformable mirror will be adjusted to impart onto the light wavefront a function that produces a larger DOF, such as a spherically-aberrated wavefront. For example, the deformable mirror may be adjusted produce a complex shape or phase function, such as spherical aberration, a cubic phase mask, an annular aperture (Bessel), or a series of annular sub-apertures (wedding cake), or any combination thereof.

In some embodiments, the adaptive optical element 240 may be utilized for rapid axial-scanning (that is, along z-axis) with the desired DOF of the objective 210, the desired DOF set according to the measure (e.g., FWHM) of light-sheet thickness with the adaptive optical element 240. Direction of axial scanning is shown by arrow 252. As a non-limiting example, during imaging with a light microscope including a deformable mirror for DOF adjustment, prior to initiating axial scanning, the detection DOF may be adjusted according to the light-sheet thickness with the deformable mirror, and upon initiating the scan, the deformable mirror may be adjusted so as to shift the objective focal plane axially (that is, to coincide with the illumination plane of the light-sheet which is also translated axially during axial scanning) while maintaining the adjusted DOF at each focal plane. For example, the deformable mirror could be adjusted to present a wavefront function that scans through a range from negative to positive curvature to achieve axial scanning. Then, to perform axial scanning and maintain adjusted DOF simultaneously, the deformable mirror could be adjusted to present a linear superposition of the wavefront function that produces the axial scanning and the wavefront function that produces the adjusted DOF. In other words, producing a parabolic shape or a defocus phase function with the deformable mirror is used to generate an axial shift that may be used for axial scanning. Assuming the deformable mirror has a sufficiently large stroke, a phase map for adjusting the DOF can be additively combined with an axial scanning phase map to perform both of these functions simultaneously.

In this way, by using the adaptive optical element for DOF adjustment as well as axial scanning (by a remote refocusing process), a mechanical overhead (e.g., a piezo electric collar or a piezo electric stage) to move the detection objective or the stage may be reduced. As a result, any vibration or disturbances to the specimen under observation, as well as any image blur at high focusing speeds is reduced while improving photon collection. Additional details of performing axial scanning for volumetric imaging will be described with respect to FIG. 9.

While the above example describes implementing a deformable mirror for DOF adjustment, the adaptive optical element 240 may be implemented by a spatial light modulator, diffractive optic, or refractive optic that introduces aberration, a cubic phase mask, an annular aperture, or a series of annular sub-apertures (also referred to herein as multi-ring annular phase mask), or any combination thereof, to instantaneously extend the detection DOF such that it is comparable to or greater than the measure of the light-sheet FWHM thickness, while largely maintaining the lateral resolution. For example, the detection DOF may be extended to be greater than the inherent DOF, but in some cases, may be adjusted to be less than the measure of light-sheet thickness depending on one or more of an average signal intensity, sample volume, and desired axial resolution. In some examples, the objective DOF may be adjusted to be equal to or greater than the measure of light-sheet thickness.

In yet another embodiment, the adaptive optical element 240 may be a microlens array (MLA) that captures a four-dimensional (4D) light-field. Accordingly, the MLA may be positioned at the focal plane of the lens 234, thus conjugated to the pupil plane of the microscope objective 210. The MLA then forms the image directly on camera 250, without needing the use of lens 236. The MLA multiplexes 2D spatial and 2D angular information of incident light-field onto the imaging sensor 250, thereby enabling extended DOF by an amount specified by the parameters of the MLA in relation to the parameters of the rest of the optical set up. The recorded light-field may further be computationally reconstructed into a volume, via the controller 140.

Figure 3:
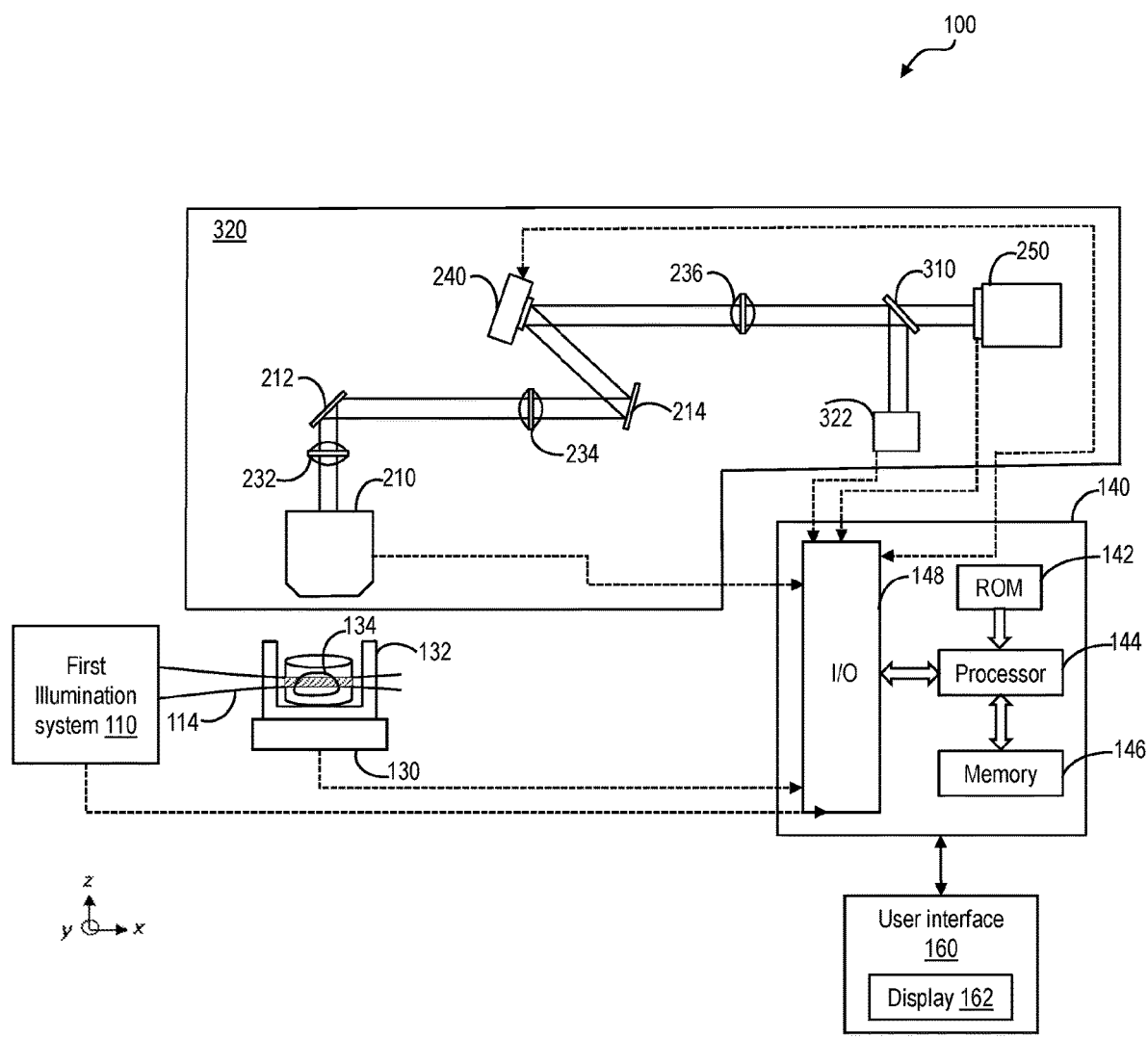
FIG. 3 shows a schematic depiction of another embodiment of the detection system of FIG. 2.

In some embodiments, a sensing element may be included to measure one or more parameters of the light from the adaptive optical element 240. FIG. 3 shows a schematic illustration of a detection system 320 including a sensing element 322, according to another embodiment of the disclosure. In this example, the sensing element 322 is configured as a Shack-Hartmann wavefront sensor, wherein the Shack-Hartmann wavefront sensor comprises a MLA and a camera within a sensor housing. In some examples, the Shack-Hartmann wavefront sensor may not be within the same sensor housing. That is, the Shack-Hartmann sensor and the camera can be free from each other, such as in recording a light-field above. The sensing element may be positioned at a conjugate pupil plane of the adaptive optical element 240, via a beam splitter 310, for example, to enable measurement and calibration of the adaptive optical element 240. Further, the sensing element 322 may be used to correct aberrations from the sample and/or the detection system 320. While increasing the objective DOF may reduce axial resolution, the reduction in the axial resolution may be tolerated in order to increase photon capture. Further, when the sensing element 322 is used, image post-processing such as digital re-focusing, may be performed using signals from the sensing element 320 to correct aberrations.

As shown in FIG. 3, the sensing element 322 is communicatively coupled to the controller 140, and imaging data acquired via the sensing element 322 may be utilized for image post-processing.

Figure 4:
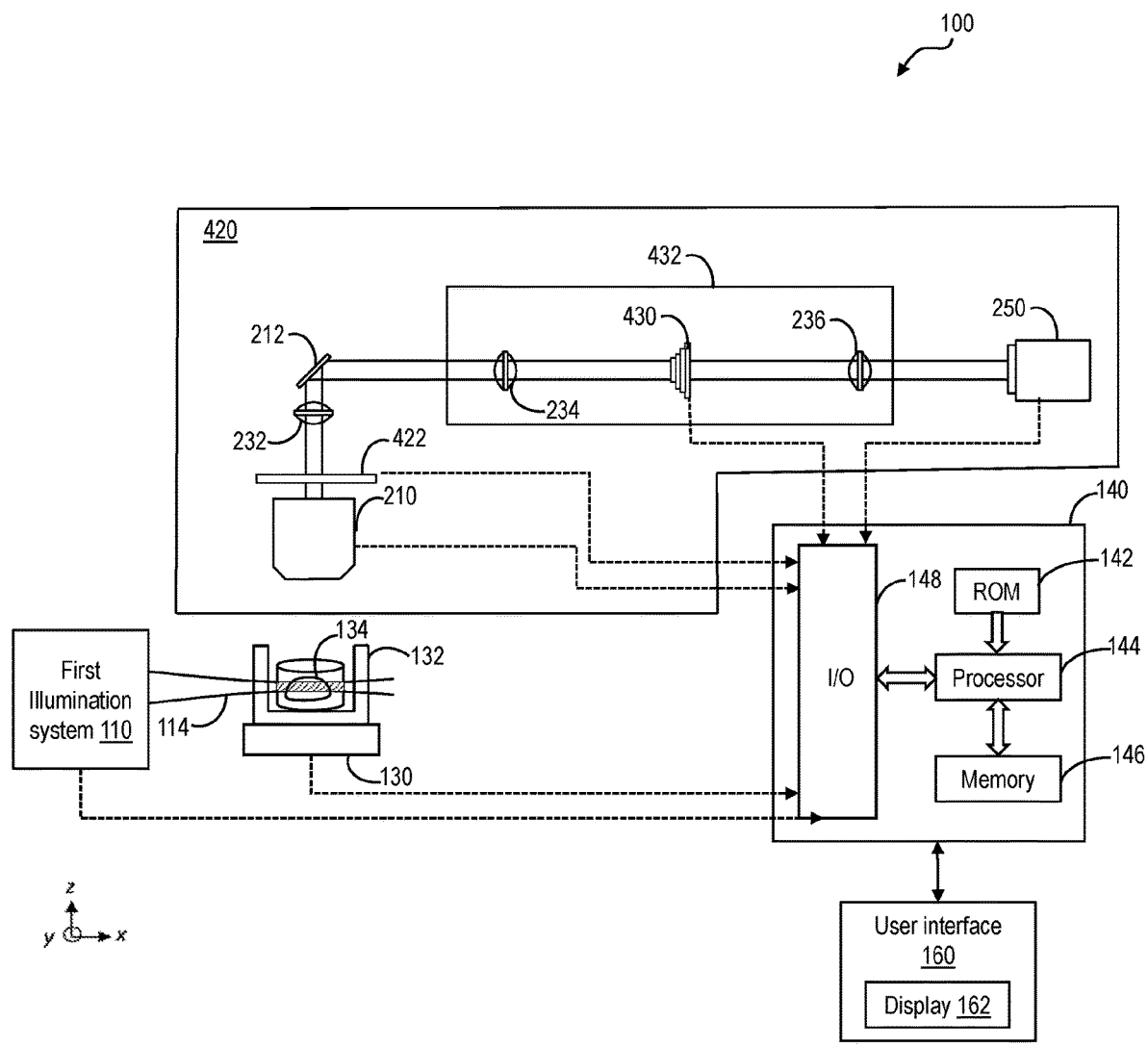
FIG. 4 shows a schematic depiction of another embodiment of the detection system of FIG. 2.

Turning next to FIG. 4, it shows a schematic diagram of a detection system 420, according to another embodiment of the disclosure. The detection system 420 may be an example of the detection system 120 at FIG. 1, and is configured to adjust a DOF of the detection objective 210 according to a measure of a light-sheet thickness in order to increase photon collection during imaging with light-sheet microscope 100.

The detection system 420 includes a static adaptive optical element 430 positioned at a conjugate pupil plane of the objective 210. To elaborate further, lenses 232 and 234 together relay a pupil plane of the objective (which may be inaccessible) to a conjugate pupil plane (that is, conjugate plane of the pupil plane) that the static adaptive optical element 430 sits. More relay lenses may be used, to create more and more instances of conjugate planes of the pupil plane, as necessary. The static adaptive optical element 430 may be used to adjust the DOF of the objective 210 according to a light-sheet thickness. The static adaptive optical element 430 may be arranged in a 4f configuration (as indicated by rectangular box 432) including the lenses 234 and 236. While the present example at FIG. 4 shows the static adaptive optical element 430 positioned at a particular conjugate pupil plane of the objective 210, the static adaptive optical element may be positioned at any other conjugate plane in the detection system to provide extended DOF of the detection objective 210. Positioning of the static adaptive optical element 430 at a location near any usable pupil plane is also possible, and within the scope of the disclosure.

In one example, the static adaptive optical element is a phase mask used for extending DOF of the objective 210. In the example shown at FIG. 4, the static adaptive optical element 430 is a multi-ring annular phase mask. The multi-ring annular phase mask includes multiple concentric glass disks, each of which forms independent apertures that add together to produce an overall axially elongated focus. Accordingly, the multi-ring annular phase mask divides a full back-pupil plane of the high NA detection objective into multiple apertures, which are mutually incoherent. Due to the short coherence length of the detected light, images from different aperture zones form independently and combine incoherently into a final image.

The amount of DOF scales linearly to the number of disks in the refractive optic when the full pupil of the detection objective is utilized, and can thus be adjusted to the light-sheet thickness. In this way, each annulus maps different parts of the back pupil of the detection objective, with the aperture zones of the phase mask capturing different wavevectors (e.g., lateral spatial features) but producing the same amount of extended focus. For example, as a thickness of the light-sheet increases, a phase mask with more number of annular rings may be used. As a non-limiting example, a plurality of annular phase masks, each with a different DOF extension (hence, a different number of rings) may be mounted in a static adaptive optical unit housing (e.g., on a filter wheel). Based on a light-sheet thickness, a corresponding phase mask may be selected such that the selected phase mask is positioned in the pupil plane of the objective 210.

In another example of a method to adjust the DOF, a phase mask with a fixed number of annular rings maybe used, but the focal lengths of lenses 232 and 234 might be adjusted to produce an optimal size for the conjugate pupil aperture at the phase mask. As the size of the pupil aperture increases or decreases, the detection light (that is, fluorescence signal from the objective) will go through more or less of the annular rings, thus increasing or decreasing the DOF, respectively, to match with the light sheet thickness.

In one example, the DOF is adjusted by utilizing optical components (e.g., lenses 232 and 234) to change the pupil aperture diameter, to effectively pass the detected light through a smaller or larger area of the static adaptive optical elements, which results in the adjustments of the DOF.

The detection system 420 further includes a piezo electric collar 422. The piezoelectric collar may be used for rapid axial scanning (that is, along the z-axis) during a z-stack acquisition. For example, the detection objective 210 may be adjusted, via the piezo electric collar 422 based on actuation signals from the controller 140, synchronously with the excitation light-sheet in the axial direction as the sample remains stationary, and images are acquired serially to create a 3D z-stack. In this embodiment, prior to performing the axial scanning, the DOF may be adjusted using the phase mask (that is, the static adaptive optical component 430) according to a measure (e.g., FWHM) of the light-sheet thickness and upon initiation of the axial scanning, the objective focal plane may be adjusted by the piezo electric collar (by moving the objective along the z-axis) while the adjusted DOF may remain the same at each focal plane (that is, x-y plane) of the objective 210.

In this way, by employing an extended DOF at each focal plane during volumetric imaging (that is, during generating a z-stack) according to the thickness of the light-sheet that is used for performing the z-stack, photon collection is optimized at each focal plane, and an overall signal to noise ratio is improved.

While the static optic element 430 in the embodiment at FIG. 4 is described using an annular phase mask as an example, the static adaptive optical element 430 may be implemented by a diffractive optic, a refractive optic, or a cubic phase mask or any combination thereof.

Figure 5:
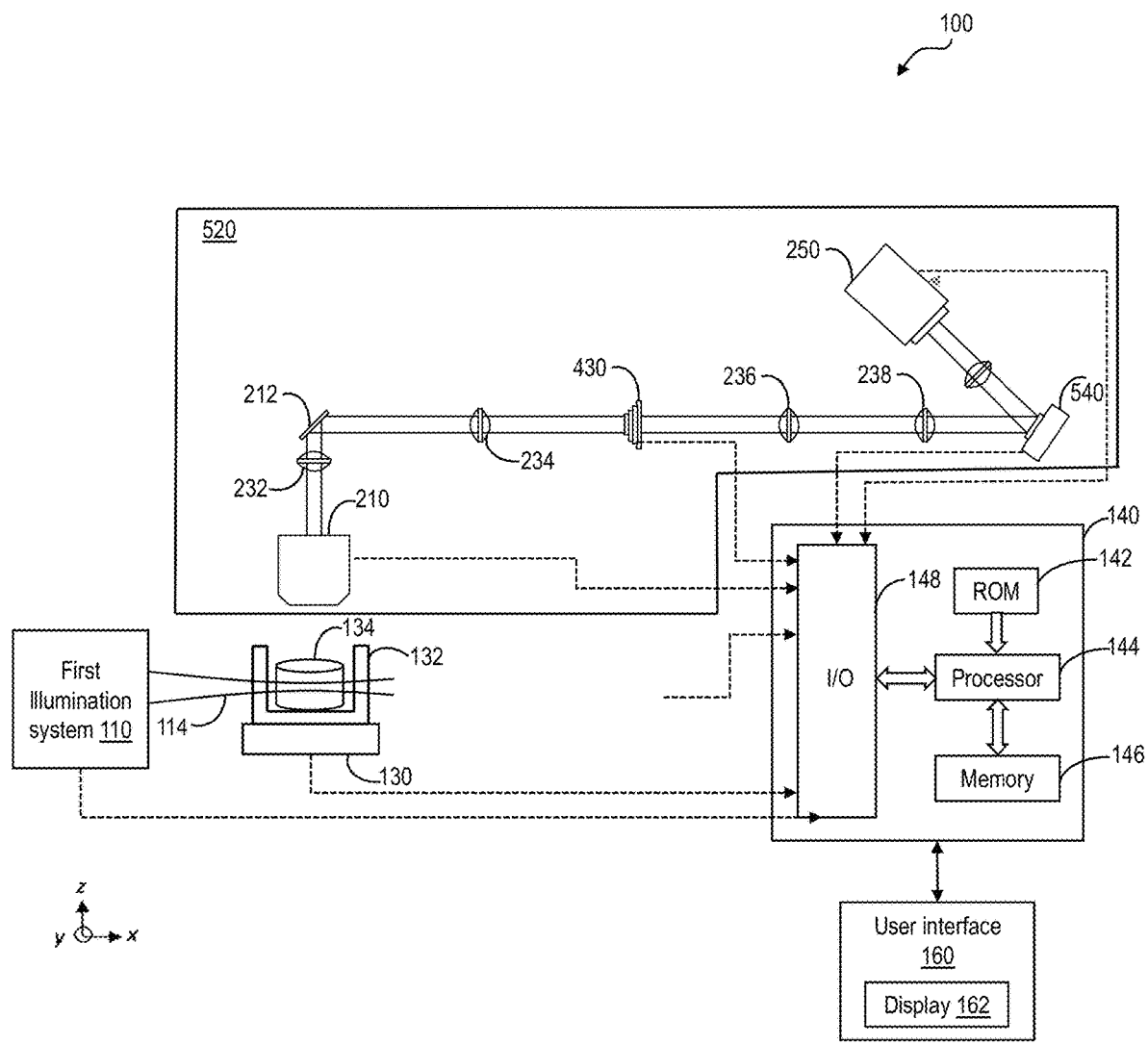
FIG. 5 shows a schematic depiction of another embodiment of the detection system of FIG. 2.
Figure 6A:
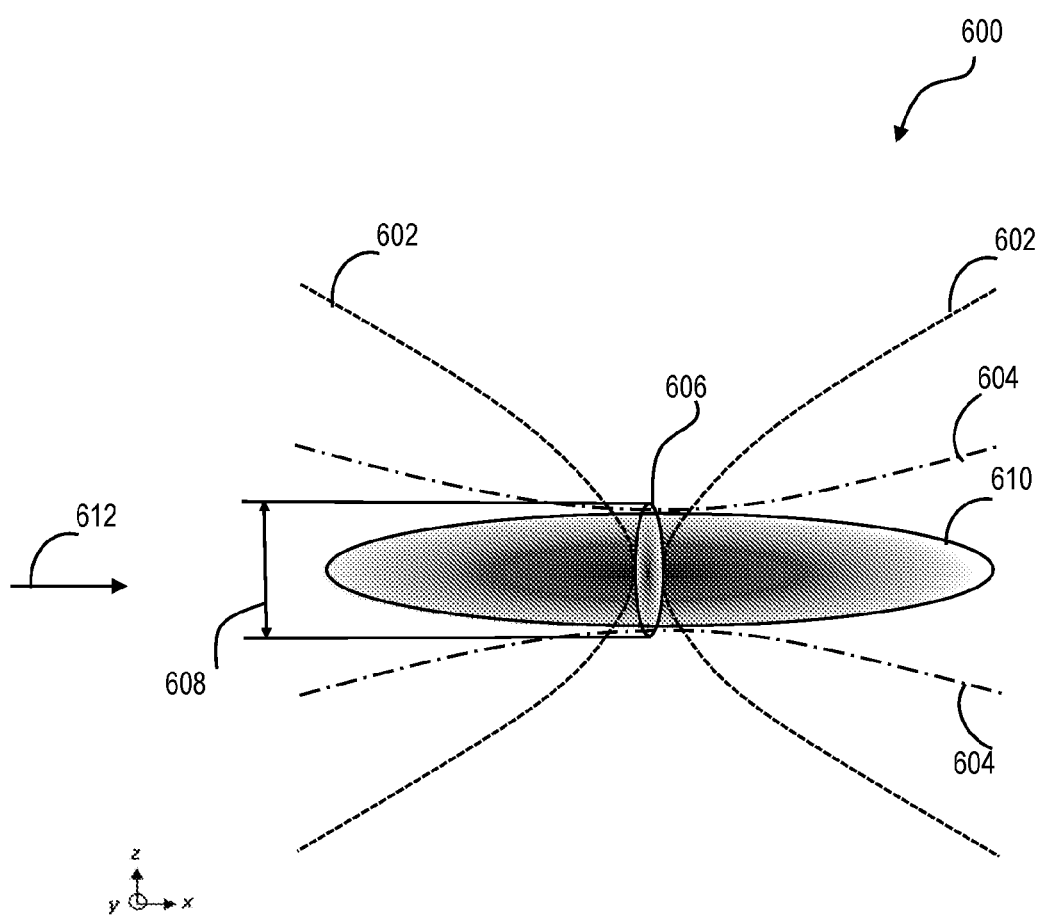
FIG. 6A shows a schematic depiction of an example extended depth of field obtained with a detection system of a light-sheet microscope, according to an embodiment of the disclosure.
Figure 6B:
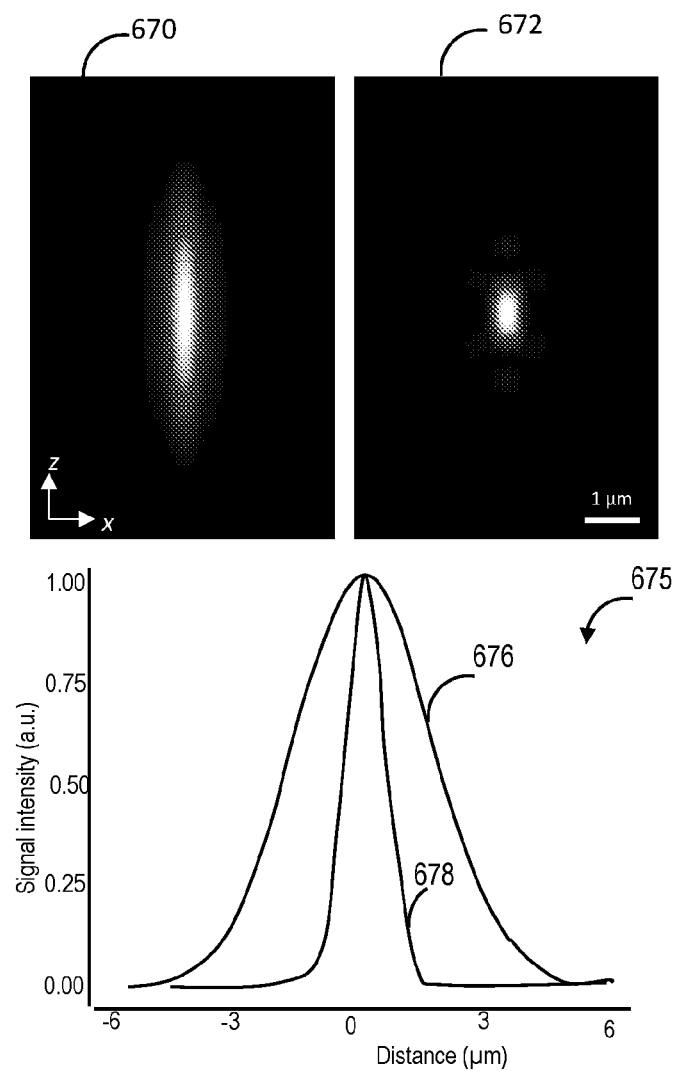
FIG. 6B shows a graph of signal intensity captured by a detection system of a light-sheet microscope, according to an embodiment of the disclosure.

FIG. 5 shows a schematic depiction of a detection system 520 according to another embodiment of the disclosure. The detection system 520 may be an example of the detection system 120 at FIG. 1. As such, the detection system 520 is configured to adjust a DOF of the detection objective 210 according to a measure of a light-sheet thickness in order to increase photon collection during imaging with light-sheet microscope 100.

The detection system 520 includes a dynamic optical element 540 in addition to the static adaptive optical element 430. The dynamic optical element 540 may be a deformable mirror, such as the deformable mirror discussed at FIGS. 2 and 3. The dynamic optical element 540 may be used for rapid axial-scanning of the detection DOF (which is adjusted by the static adaptive optical element 430) to acquire 3D information in the form of image planes from the sample volume (i.e., remote refocusing). As discussed with respect to FIG. 2, the dynamic optical element removes the mechanical overhead (e.g., piezo electric collar 422 at FIG. 4 or a piezo-actuated stage) needed to move the detection objective or sample, and thus eliminates any vibration or disturbances to the specimen under observation, reduces image blur at high focusing speeds, while increasing photon collection efficiency with the extended DOF adjusted according to the light-sheet thickness. Further, the same deformable mirror (that is, the dynamic optic element 540) can be used to simultaneously correct sample-induced aberrations, as well as aberrations caused by the optical system itself, leading to additional gains in SNR and fidelity.

Referring next to FIG. 6A, it shows a schematic illustration of a system point spread function (PSF) 600 of a light-sheet microscope, such as light-sheet microscope 100 at FIGS. 1-6. The system PSF 600 includes an illumination PSF 604 of a light-sheet, and a detection PSF 602 of a high numerical aperture (NA) objective (e.g. objective 210) that is utilized in the light-sheet microscope. In particular, the detection PSF 602 depicts an amount of adjustment of a depth of field (DOF) of the high NA objective using a detection system, such as any of the detection systems at FIGS. 1-6, the detection system comprising one or more adaptive optical elements.

A direction of propagation of an illumination beam generating the light-sheet is indicated by arrow 612. The area 610 shows an illumination intensity profile of the light-sheet at a FWHM thickness of the light-sheet, and the area 606 shows a detection intensity profile of the high objective NA at a corresponding detection FWHM. Distance 608 shows the DOF of the objective in the axial axis (that is, z-axis) adjusted according to the FWHM thickness of the light-sheet.

As shown at FIG. 6A, the DOF of the objective is adjusted so as to extend a threshold distance beyond the FWHM thickness of the light-sheet in both directions (upward and downward) along the z-axis. In one example, the threshold distance may be based on a type of light sheet. For example, a threshold distance may be greater when a multi-lobe beam such as a Bessel beam is used so as to cover signals from one or more side lobes, compared to a threshold distance when a Gaussian beam is used (which has a main lobe carrying more intensity). In some examples, the DOF of the objective is adjusted to be equal to the FWHM thickness of the light-sheet. In some other examples, the DOF of the objective is adjusted to be greater than an inherent DOF of the objective but less than the light-sheet thickness.

In this way, by adjusting the DOF of the objective to be equal to or greater than the FWHM thickness of the light-sheet, the whole full-width at half-maximum light-sheet thickness is captured, instantaneously increasing fluorescence signal photons collected and thereby providing higher signal-to-noise and contrast.

While the above example is described with respect to FWHM, any measure of thickness of the light-sheet may be used for DOF adjustment.

FIG. 6B shows a first detection PSF when the DOF is extended according to a light-sheet thickness at 670 and a second detection PSF when the DOF is not adjusted according the light-sheet thickness at 672. Bottom plot 675 shows normalized, a first Gaussian-fitted intensity profile (along the axial (z) direction) for the first detection PSF at trace 676 and a second Gaussian-fitted intensity profile for the second detection PSF at trace 678. As shown at FIG. 6B, more integrated signal is obtained with when the DOF is extended according to the light-sheet thickness compared to when the DOF is not extended (which results in signal loss).

The above examples of DOF adjustment are described with respect to a light-sheet microscope having the detection light path arranged in a non-collinear manner with the illumination light path, wherein the excitation light-sheet is propagated through a different objective than the detection light path. For example, the above systems show an optical axis of the high-NA detection objective positioned substantially perpendicular to the excitation light-sheet, and the detection objective is adjusted so as to extend the depth of field according to the light-sheet. It will be appreciated that the DOF adjustment may be performed using other configurations of a light-sheet microscope without departing from the scope of the disclosure.

For example, multiple coplanar detection objectives may be used to collect more fluorescence signal photons from multiple views of the sample, and combined and fused to enhance the resolution and sensitivity. When multiple detection objectives are used, each detection objective may be adjusted such that DOF of each objective covers a measure (e.g., FWHM) of the light-sheet illuminating the specimen. Further, multiple coplanar illumination objectives, such as the illumination systems shown at FIG. 1, may also be used to improve illumination coverage and spatial uniformity over large regions of the specimen.

As another example, the illumination and detection light path may be arranged to be collinear, wherein an excitation light-sheet and the detection light path pass through the same primary high-NA objective lens while still keeping the optical axis of the detection light path substantially perpendicular to the excitation light-sheet. For example, the illumination beam may enter the (shared) primary objective lens under filled and off-center, yielding an oblique light path and hence oblique light-sheet at the sample. Fluorescence signal photons from the oblique light-sheet may be captured by a tertiary imaging system, which is obliquely aligned such that the optical axis is at an angle substantially perpendicular to the excitation light-sheet. A volume can then be rapidly acquired via remote refocusing. In such instances, the secondary and tertiary objective lenses can be index-mismatched. For example, the secondary objective lens can be an air objective, the tertiary objective lens can be a water-immersion objective, and the medium separating their focal space can be an air-water interface (such as a coverslip). This compresses the angular point-spread function (the 3D emitter captured from the primary objective) to a cone angle that can be collected with existing water-immersion objective lenses, thereby enabling nearly the full NA of the primary objective and thus preserving its high light gathering ability. Alternatively, any custom tertiary objective (such as a glass-tipped objective) that compresses the light cone angle of the secondary objective to preserve the NA of the primary objective can be used. The DOF of the tertiary objective is extended such that it is comparable to or greater than the light-sheet FWHM thickness, while largely maintaining the lateral resolution.

Depth of Field Adjustment in Light-Sheet Microscopy

Figure 7:
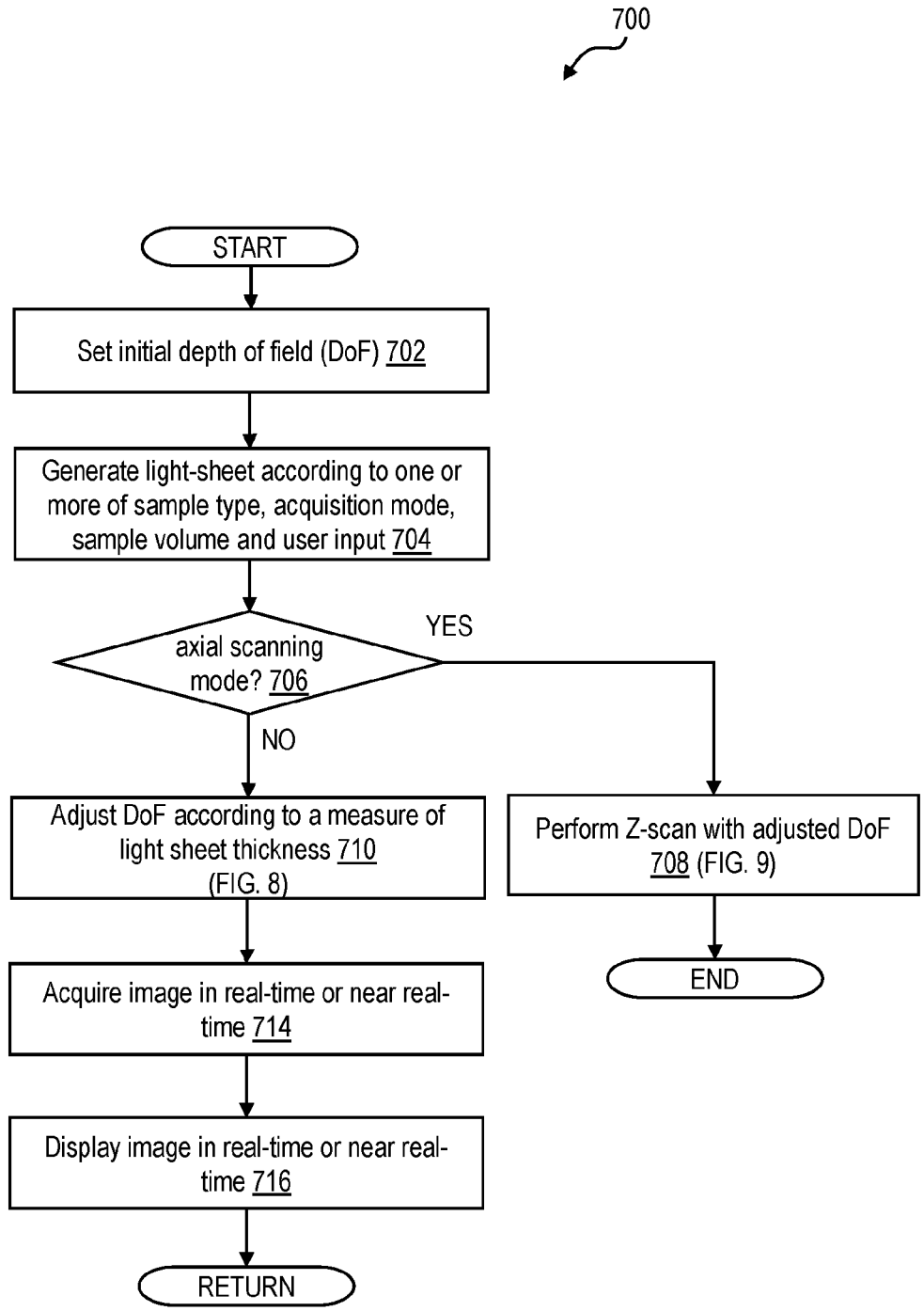
FIG. 7 shows a flow chart depicting an example method for a light-sheet microscope, according to an embodiment of the disclosure.

FIG. 7 shows a high-level flow chart illustrating an example method 700 for operating a light-sheet microscope, such as the light-sheet microscope at FIGS. 1-5. The method 700 and other methods described herein may be executed by a microscope processor, such as processor 144 according to instructions stored in a memory, such as memory 146. The method 700 and other methods herein will be described with respect to FIGS. 1-5, although it will be appreciated that the method 700 and other methods may be implemented by other microscope systems without departing from the scope of the disclosure. The method 700 may be initiated after start-up of the light-sheet microscope.

At 702, the method 700 includes operating the microscope with an initial DOF of a detection objective of the light-sheet microscope. The initial DOF may be the intrinsic DOF of the detection objective based on its numerical aperture.

Next, 704, the method 700 includes generating a light-sheet via an illumination system of the light-sheet microscope comprising one or more illumination objectives and one or more lenses. The light-sheet may be generated according to one or more light-sheet parameters including a desired light-sheet thickness. In one example, the desired light-sheet thickness may be determined by the processor based on one or more of sample parameters (e.g., volume, thickness, type, etc.), an acquisition mode (z-scan, time-lapse, etc.,), and a mounting medium. Additionally, or alternatively, a user may input the desired light-sheet thickness via a user interface coupled to the processor.

Next, at 706, the method 700 includes determining if a current acquisition mode is an axial-scanning mode. If yes, the method proceeds to 708. At 708, the method 700 includes performing an axial scan with DOF of the objective adjusted according to sample light-sheet thickness. Details of performing the axial scan with DOF adjustment is shown at FIG. 9. If the answer at 706 is NO, the method 700 proceeds to 710. At 710, the method 700 includes initiating fluorescence imaging of a sample, wherein the DOF of the objective is adjusted according to the light-sheet thickness. The DOF of the objective may be adjusted by using one or more adaptive optical elements (e.g., phase mask, deformable mirror, etc.) in a detection light path (that is, light path through the detection objective to an imaging sensor (e.g., CMOS sensor)). Details of DOF adjustment is further elaborated with respect to FIG. 8.

Figure 8:
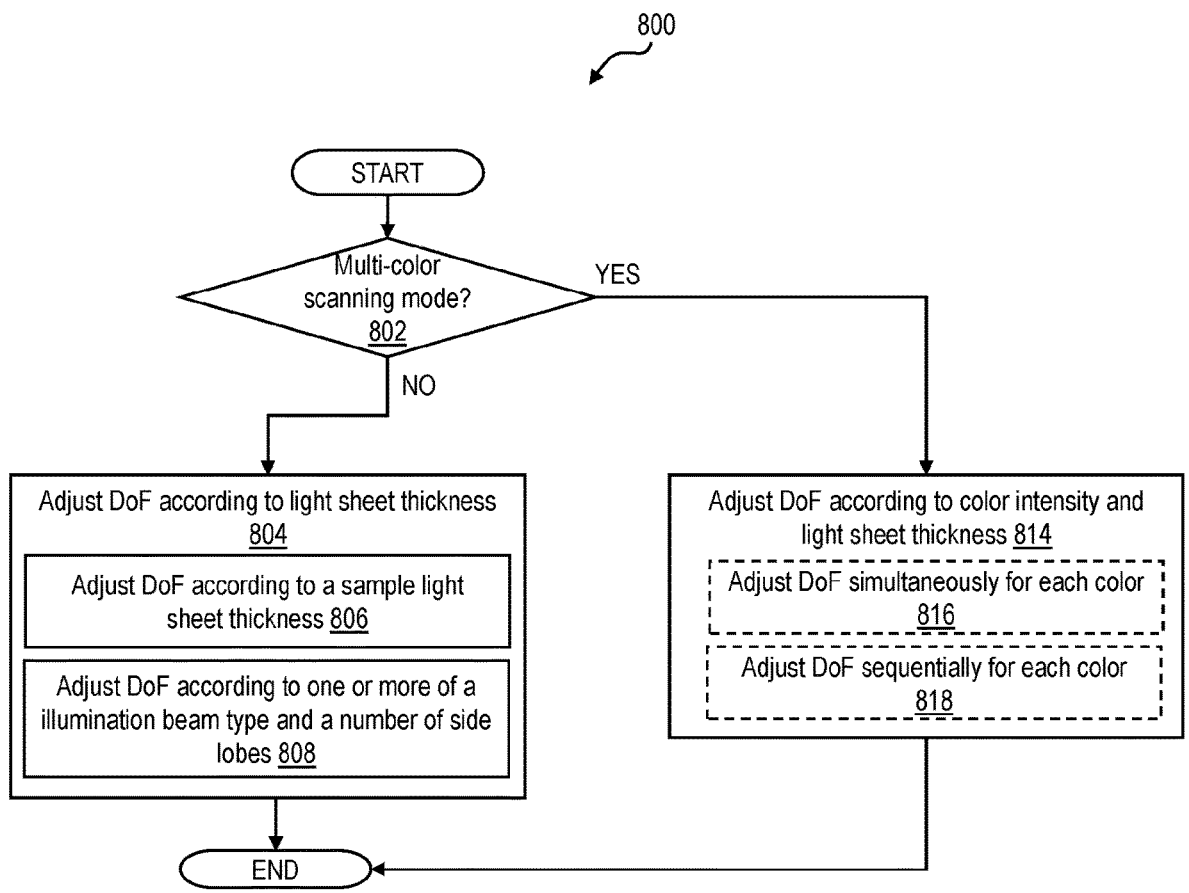
FIG. 8 shows a flow chart depicting an example method for adjusting a depth of field of a detection system of a light-sheet microscope, according to an embodiment of the disclosure.

Turning to FIG. 8, it shows a high-level flow chart illustrating an example method 800 for adjusting the DOF of the objective. At 802, the method 800 includes determining of the light-sheet microscope is operated in a multi-color scanning mode. If the answer is NO, the method 800 proceeds to 804.

At 804, the method 800 includes adjusting the DOF of the objective according to the light-sheet thickness. In one example, the light-sheet thickness may be a sample light-sheet thickness (as indicated at 806). That is, a thickness of the light-sheet passing through the sample. For example, due to diffraction, a thickness of the light-sheet may be greater within the sample. In particular, when an excitation light-sheet covers a large field of view (in the direction of propagation of the excitation light), diffraction of the light within the sample may increase the thickness of the excitation light-sheet. Therefore, the DOF of the objective is adjusted to be greater than or equal to the sample light-sheet thickness. The sample light-sheet thickness that is utilized for DOF adjustment may be based on an intensity profile of the excitation light-sheet. Accordingly, in one example, the sample light-sheet thickness is determined based on a full width at half maximum (FWHM) of the excitation light-sheet, wherein the FWHM includes a greater amount (peak intensity to 50% of peak intensity) of intensity distribution of the light-sheet, and therefore, by increasing a DOF of the objective to be greater than or equal to the FWHM, a greater amount of fluorescence photons are captured by the objective, thereby improving signal to noise ratio and contrast. In some examples, other measures of light-sheet thickness may be used, such as a percentage of thickness, $1/e^2$, or any function of light-sheet thickness may be used.

In one example, the sample light-sheet thickness may be estimated based on one or more of a generated light-sheet thickness, a field of view of the generated light-sheet, one or more sample parameters (e.g., volume, type (e.g., animal tissue, plant tissue, etc.)) and mounting medium.

Additionally or alternatively, adjusting the DOF according to the light-sheet thickness includes, at 804, adjusting the DOF according to one or more of the illumination beam type and a number of side lobes 808. For example, depending on a type of illumination beam used to generate the excitation light-sheet, the intensity profile of the light-sheet may vary. As a non-limiting example, a Gaussian beam light-sheet may have an intensity profile comprising a main lobe including the peak intensity and the intensity decreases monotonically according to a Gaussian distribution. Thus, when imaging with a Gaussian beam light-sheet, the DOF may be adjusted according to a thickness of the main lobe as main lobe thickness includes a majority of the light-sheet intensity. However, when imaging with light-sheets generated based on propagation invariant beams, such as Bessel beams, Airy beams, etc., the light-sheet intensity profile includes side lobes that contain intensity distribution to a greater extent compared to the Gaussian beam light-sheet. Accordingly, the DOF may be adjusted by taking into account intensity profile of the main lobe as well as one or more side lobes. In some examples, a user may adjust the DOF (e.g., by remote refocusing) according to a thickness of a main lobe and/or one or more side lobes. As a non-limiting example, the user may select a desired number of side lobes to take in account for light-sheet thickness calculation that is used for DOF adjustment.

In one non-limiting example, a user, via a user interface, may adjust the DOF according to an indication of a measure of light-sheet thickness. For example, an intensity profile of the light-sheet with respect to a distance covered by the light-sheet along axial direction (that is, z-axis) may be provided to the user on a display screen of a user interface coupled to the controller of the microscope. The user may then adjust the DOF to as to achieve a desired signal intensity coverage and/or light-sheet thickness coverage. In some examples, the user may view the acquired image and accordingly adjust the DOF to increase or decrease photons captured by the objective.

Returning to 802, if the light-sheet fluorescence imaging is performed in the multi-color mode, the DOF of the objective may be adjusted according to one or more of a light-sheet thickness and a color intensity 814.

Adjusting the DOF during multi-color imaging may include, at 816, adjusting the DOF simultaneously for each color. For example, when the detection is carried out for simultaneous imaging of multiple colors, with different detection paths, the detection DOF could be adjusted to be optimal for each separate color channels, as these different colors would have different trade-off between axial resolution and photo collection efficiency. For example, one color may be brighter and hence the detection DOF could be adjusted to be smaller than the light-sheet thickness (but greater than the inherent DOF) to achieve better axial resolution, while another color might be dimmer and hence the detection DOF could be adjusted to be comparable to the light-sheet thickness to achieve better photon collection efficiency.

Alternatively, adjusting the DOF during multi-color imaging may include, at 818, adjusting the DOF sequentially for each color. For example, where the multicolor imaging is performed sequentially, (e.g., through the use of a filter wheel where the different colors are recorded one after another) the detection DOF could then be adjusted sequentially, to match the needed value optimal for each color. In this case, the device used for adjusting the DOF could be a dynamic optical element (such as a deformable mirror or spatial light modulator) or multiple static adaptive optical elements (such as a phase mask) mounted on a mechanism that allows mechanical switching (such as a filter wheel).

In this way, the DOF of the detection objective may be adjusted depending on the imaging mode and/or the illumination beam type to optimize photon collection.

Returning to FIG. 7, upon adjusting the DOF of the objective according to the light-sheet thickness, the method 700 proceeds to acquire, via an imaging sensor (e.g., CMOS sensor) the fluorescence images in real-time or near real-time (step 714) and display the acquired images in real-time or near real-time (step 716).

In some examples, one or more images may be recorded in conjunction with varying DOF according to a spatial pattern of the side lobes of the light sheet, and then image processing algorithms may be applied on the recorded images to improve the quality of the resulting images. As a non-limiting example, incoherent structured illumination may be applied for illuminating the sample (for example, by varying the spatial pattern of the side lobes of the light sheet) and the subsequently performing image processing (digital post-processing) of the recorded images. Accordingly, in one example, a method for light-sheet microscopy includes acquiring more than one image in conjunction with varying a spatial pattern of one or more side lobes of the light-sheet; and applying one or more image post-processing on the more than one acquired images; wherein acquiring more than one image in conjunction with varying the spatial pattern of the one or more side lobes includes applying incoherent structured illumination to vary the spatial pattern of the one or more side lobes; and wherein a depth of field of an objective of the light sheet microscope is adjusted according to the one or more side lobes.

Next, FIG. 9 shows a high level flow-chart illustrating an example method 900 for performing axial scanning with the DOF adjusted based on a light-sheet thickness.

At 902, the method 900 includes adjusting the DOF according to the light-sheet thickness. The adjustment of the DOF is performed as discussed above with respect to FIGS. 7 and 8.

Next at 904, the axial scanning may be performed with the adjusted DOF. In one example, as indicated at 906, performing axial scanning may include scanning (that is, moving along a selected axis) the sample axially (along the z-axis) while the light-sheet position and the objective position remains static.

In another example, as indicated at 908, performing axial scanning may include scanning the light-sheet while scanning the translation stage (e.g., piezoelectric collar 422 at FIG. 4) mounting the objective.

In yet another example, as indicated at 910, performing axial scanning may include performing axial scanning by remote refocusing, wherein the axial scanning is performed by scanning, via an adaptive optical element, the detection objective focal plane in coordination and alignment with light-sheet scanning. In this example, the adaptive optical element used for scanning the objective focal plane is also used for adjusting the depth of field (step 902).

In still another example, as indicated at 912, a different adaptive optical element may be used for axial scanning. For example, while a phase mask may be used for extending the DOF, a deformable mirror may be used for scanning the objective focal plane.

In this way, by adjusting the DOF during axial scanning, photon collection efficiency is improved.

EXAMPLES

The following examples are provided to better illustrate the claimed invention and are not intended to be interpreted as limiting the scope of the invention. To the extent that specific materials or steps are mentioned, it is merely for purposes of illustration and is not intended to limit the invention. One skilled in the art may develop equivalent means or reactants without the exercise of inventive capacity.

Example: Experimental Data

The disclosed systems and methods were tested on larval zebrafish samples. In particular, calcium functional imaging was carried out at 10 Hz using SPIM microscopy without depth of field adjustment and with extended depth of field adjusted according to the light-sheet thickness. The extended DOF was achieved using an annular phase mask.

The results of the calcium functional imaging are shown at FIGS. 10A and 10B. FIG. 10A shows a fluorescence image 1002 obtained with extended DOF and a fluorescence image obtained without extended DOF. An enlarged portion of 1002 is shown at 1004, and a corresponding enlarged portion of 1012 is shown at 1014. Further, FIG. 10B shows intensity profile with standard deviation over a duration of time. Trace 1032 shows average intensity obtained without extended DOF and trace 1034 shows average intensity obtained with extended DOF. As shown, when the DOF was extended according to the light-sheet thickness, 46% more active neurons were captured in measuring spontaneous brain activity of larval zebrafish as compared to the imaging without extended DOF.

Example: Multi-Color Axial Scanning

A prophetic example sequence 1100 illustrating an example multi-color axial scanning for volumetric imaging is shown. The first plot from the top of FIG. 11 shows light sheet thickness over time. The light sheet thickness increases in the direction of arrow. The second plot from the top of FIG. 11 shows average fluorescence intensity over time. Line 1105 represents a threshold intensity. The average fluorescence intensity increases in the direction of arrow. The third plot from the top of FIG. 11 shows position of light-sheet along z axis over time. The light sheet position moves upwards in the direction of z-axis arrow. The fourth plot from the top of FIG. 11 shows change in detection objective DOF over time. The DOF increases in the direction of arrow. The fifth plot from the top of FIG. 11 shows position of objective focal plane position along z axis over time. The light sheet position moves upwards in the direction of z-axis arrow.

Prior to initiating axial scanning, between t0 and t1, the DOF is an inherent DOF of the detection objective (trace 1108), such as objective 210 at FIGS. 2-5. A dimmer color is imaged, and as such the average intensity (trace 1106) is less than the threshold 1105. At t1, an axial scanning is initiated to scan the dimmer color. Accordingly, at t1, responsive to the average intensity less than the threshold 1105, the DOF is increased according to light-sheet thickness (e.g., FWHM). Further, during axial scanning between t1 and t2, the DOF is maintained and the light-sheet and the objective focal plane position are adjusted to coincide and scanned along the z-axis to acquire 3D image stack. Due to the DOF adjustment, the average fluorescence intensity is increased (trace 1104).

Just prior to t2, the axial scan with the dimmer color is complete, and the acquisition may switch to a brighter color, and the DOF is reset to inherent DOF (trace 1108). The light sheet position and the objective focal plane position are returned to the starting position of the previous scan for the dimmer color. Further, due to the brighter color, the average intensity (trace 1106) is greater than the threshold 1105. Accordingly, during axial scanning to image the brighter color between t2 and t3, the DOF may not be increased and the inherent DOF may be maintained. In some examples, the DOF may be increased to be greater than the inherent DOF but less than the DOF used between t1 and t2. The DOF change may be achieved via an adaptive optical element adjustment (e.g., deformable mirror adjustment or selecting desired phase mask) by a controller (e.g., controller 140) responsive to the average fluorescence intensity. In one example, the average fluorescence intensity is based on the acquired image.

In this way, the detection objective DOF may be adjusted according to light sheet thickness as well as signal intensity to increase signal capture during volumetric scanning.

In one example, the use of a high-numerical-aperture (NA) objective lens for detection is generally desirable, because it enables high spatial resolution as well as high light collection, which is critical for maximizing SNR while minimizing photodamage to living specimens. The penalty for high-NA optics is the short depth-of-focus (DOF), typically ~1 micron, since the DOF is inversely proportional to the NA squared. While this provides intrinsically high axial resolution, this is often much more than is needed for cellular imaging across large tissue-level length scales (on the order of hundreds of cubic microns). To image such volumes with light-sheet microscopy, an elongated focused beam of light that spans several hundreds of microns in its propagation direction is well-suited to rapidly achieve a large field-of-view. Owing to diffraction, such a focus generates an excitation light-sheet that has a full-width at half-maximum (FWHM: measure over which the intensity is within 50% of the maximum intensity) thickness of several microns or more. This is sufficiently thin to optically section and Nyquist sample at single-cell resolution; however, much of the light-sheet FWHM thickness lies beyond the detection DOF of the high-NA objective. As a result, fluorescence signal photons from illumination outside the DOF detection optics are corrupted or lost, greatly compromising the achievable SNR, useful contrast, and imaging speed. The systems and methods described herein overcome a fundamental tradeoff and oft overlooked challenge in light-sheet microscopy between the thin depth of focus DOF of high-NA detection optics and the thicker light-sheets inherent to large field-of-view excitation beams. This is done by extending the DOF of a detection objective so that it is comparable to or greater than the FWHM thickness of the sheet of excitation, instantaneously increasing signal photons collected and thereby providing higher SNR and contrast, as illustrated in FIG. 6A. By extending the DOF, shorter exposures are required to produce images of the same or acceptable SNR, increasing the volumetric imaging speed. In addition, reduced illumination doses are required to record images of the same or acceptable SNR, decreasing rates of photobleaching and photodamage to the specimen.

In one general aspect, a microscope can include an excitation light source and focusing optics configured to direct the excitation light to the sample in a light-sheet having a FWHM thickness. The microscope includes a detection light path configured for capturing images of light emitted from the sample in response to the excitation light-sheet, where the optical axis of the detection objective is substantially perpendicular to the excitation light-sheet and the detection objective has a high-NA with an intrinsic DOF that is less than the light-sheet FWHM thickness. The detection light path is configured to image the back aperture (i.e., pupil plane or Fourier plane) of the detection objective, via a 4f arrangement, onto an adaptive optical element, which instantaneously extends the DOF of the detection objective such that it is comparable to or greater than the FWHM thickness, thus capturing signal photons that would otherwise be wasted. Recorded signal photons in the detection light path propagate to an imaging detector, which registers the signal photons simultaneously with a two-dimensional (2D) array of light sensitive elements, capturing an image of the entire FWHM thickness in one shot. The microscope further includes a processor configured for controlling the excitation light source, optical elements, and detection light path, and processing the detected images.

The adaptive optical element can be a deformable mirror that introduces aberration (such as spherical) to instantaneously extend the detection DOF such that it is comparable to or greater than the light-sheet FWHM thickness, while largely maintaining the lateral resolution, as illustrated in FIG. 6A. Alternatively, the deformable mirror can provide instantaneous extended focus of the detection objective by controlled wavefront shaping, a cubic phase mask, an annular aperture, or a series of annular sub-apertures, or various combinations thereof. The same deformable mirror can also be used for rapid axial-scanning of the detection DOF to acquire three-dimensional (3D) information in the form of image planes from the sample volume (i.e., remote refocusing). This removes the mechanical overhead needed to move the sample or detection objective, as is conventionally done, and thus eliminates any vibration or disturbances to the specimen under observation, as well as any image blur at high focusing speeds. Further, the same deformable mirror can be used to simultaneously correct sample-induced aberrations, as well as aberrations caused by the optical system itself, leading to additional gains in SNR and fidelity.

In another general aspect, the adaptive optical element can be a spatial light modulator, diffractive optic, or refractive optic that introduces aberration, a cubic phase mask, an annular aperture, or a series of annular sub-apertures, or various combinations thereof, to instantaneously extend the detection DOF such that it is comparable to or greater than the light-sheet FWHM thickness, while largely maintaining the lateral resolution, as illustrated in FIG. 6A.

In some examples, a Shack-Hartmann wavefront sensor can be positioned to a conjugate pupil plane of the adaptive optical element, e.g. via a beamsplitter, to enable measurement and calibration of the adaptive optic, as well as correction of aberrations from the sample and/or optical system.

In yet another embodiment, the adaptive optical element can be a microlens array that captures a four-dimensional (4D) light-field, i.e., Fourier light-field microscopy. The microlens array encodes the spatial and angular information of the incident light, enabling two- to three-fold instantaneous extended DOF; the recorded light-field can further be computationally reconstructed into a volume.

In some instances, computational processing and deconvolution can be used to compensate for any distortions in lateral resolution induced by extending the DOF.

Implementations of the excitation light-sheet can be linear, where the signal intensity is proportional to the excitation light intensity, such as one-photon-excited fluorescence, elastic light scattering, and inelastic light scattering (e.g., Raman or Brillouin); or nonlinear, where the signal intensity is proportional to the second (or third) power of the excitation light intensity, in which the sample interacts with two (or three) photons near-simultaneously, such as two-photon-excited fluorescence, second-harmonic generation, three-photon-excited fluorescence, and higher-order processes; created either by a simple cylindrical lens, or by scanning a Gaussian beam, generated via a low NA objective lens, with galvanometer or resonant scanners.

In another general aspect, propagation-invariant beams, such as Bessel-Gauss (e.g., Bessel beam of finite length) or Airy-Gauss beams, can also be used for light-sheet excitation.

Compared to conventional Gaussian beams, these more exotic beams generally have a thinner main lobe for a comparable field-of-view. In such instances, the detection DOF can be extended to record not only signal intensity from the main/central lobe, where intensity is typically the highest, as is customary, but also signal from the side lobes (i.e., signal generated from outside the main lobe), to collect more signal photons and improve the computational processing and deconvolution and thus resulting image quality.

Implementations of the illumination and detection light path can be arranged to be non-collinear: the illumination light path sends the excitation light-sheet through a different/separate lens than the detection light path, the optical axis of the high-NA detection objective is substantially perpendicular to the excitation light-sheet, and the detection objective has extended focus. Further, multiple coplanar detection objectives with extended focus, preferably but not necessarily mounted orthogonally to each other, can be used to collect more fluorescence signal photons from multiple views of the sample, and combined and fused to enhance the resolution and sensitivity. Multiple coplanar illumination objectives, preferably but not necessarily mounted orthogonally to each other, can also be used to improve illumination coverage and spatial uniformity over large regions of the specimen.

In another general aspect, the illumination and detection light path can be arranged to be collinear: the illumination light path sends the excitation light-sheet through the same primary, high-NA objective lens as the detection light path while still keeping the optical axis of the detection light path substantially perpendicular to the excitation light-sheet. For example, the illumination beam can enter the (shared) primary objective lens underfilled and off-center, yielding an oblique light path and hence oblique light-sheet at the sample. Fluorescence signal photons from the oblique light-sheet can be captured by a tertiary imaging system, which is obliquely aligned such that the optical axis is at an angle substantially perpendicular to the excitation light-sheet; a volume can then be rapidly acquired via remote refocusing. In such instances, the secondary and tertiary objective lenses can be index-mismatched. For example, the secondary objective lens can be an air objective, the tertiary objective lens can be a water-immersion objective, and the medium separating their focal space can be an air-water interface (such as a coverslip). This compresses the angular point-spread function (the 3D emitter captured from the primary objective) to a cone angle that can be collected with existing water-immersion objective lenses, thereby enabling nearly the full NA of the primary objective and thus preserving its high light gathering ability. Alternatively, any custom tertiary objective (such as a glass-tipped objective) that compresses the light cone angle of the secondary objective to preserve the NA of the primary objective can be used. The DOF of the tertiary objective is extended such that it is comparable to or greater than the light-sheet FWHM thickness, while largely maintaining the lateral resolution. This approach has the benefit of providing more physical space for the sample and thus more sample versatility.

In another general aspect, the excitation light-sheet FWHM thickness and the extent of the detection DOF can be adjusted in concert with each other to accommodate various sample volumes. For example, the light-sheet thickness (and hence field-of-view) can be adjusted, via an upstream telescope to adjust the NA of the illumination light path, for various sample volumes. Whereas a standard light-sheet system would have a "fixed" detection DOF, in this implementation the DOF of the detection optics can be adjusted, preferably with an adaptive optical element, more preferably with a deformable mirror, to capture different light-sheet FWHM thicknesses in their entirety and thereby maximize light collection, as depicted in FIG. 6A. A processor controls and synchronizes the illumination NA and the extent of the detection DOF as well as the other appropriate optics and elements, making it intuitive and easy for the user to change between different light-sheet thicknesses, with the detection DOF being comparable to or greater than the light-sheet FWHM thickness.

As described above, the extended focus configuration permits shorter exposures to generate images of the same or acceptable SNR, making it well suited for rapid multicolor imaging. The captured FWHM thickness of the light-sheet can pass through a dichroic or any number of bandpass filters. In another general implementation, the captured FWHM thickness of the light-sheet can be spectrally separated, e.g., by a diffraction grating, and subsequently imaged onto a sensor.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Computer & Hardware Implementation of Disclosure

It should initially be understood that the disclosure herein may be implemented with any type of hardware and/or software, and may be a pre-programmed general purpose computing device. For example, the system may be implemented using a server, a personal computer, a portable computer, a thin client, or any suitable device or devices. The disclosure and/or components thereof may be a single device at a single location, or multiple devices at a single, or multiple, locations that are connected together using any appropriate communication protocols over any communication medium such as electric cable, fiber optic cable, or in a wireless manner.

It should also be noted that the disclosure is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented to substantially perform the particular functions discussed. Moreover, the modules may be combined together within the disclosure, or divided into additional modules based on the particular function desired. Thus, the disclosure should not be construed to limit the present invention, but merely be understood to illustrate one example implementation thereof.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a "controller" on data stored on one or more computer-readable storage devices or received from other sources.

The term "controller" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

SELECTED EMBODIMENTS

Although the above description and the attached claims disclose a number of embodiments of the present invention, other alternative aspects of the invention are disclosed in the following further embodiments.

Embodiment 1. A method for obtaining and generating an image with a light-sheet microscope, comprising: illuminating a sample with an excitation light-sheet; adjusting a depth of field of a detection objective according to a measure of a thickness of the excitation light-sheet; receiving, at an imaging sensor, fluorescence signal from the sample via the detection objective; and generating the image of the sample according to the fluorescence signal.

Embodiment 2. The method of embodiment 1, further comprising adjusting the depth of field according to a type of an illumination beam forming the excitation light-sheet.

Embodiment 3. The method of embodiment 1, wherein the thickness of the excitation light-sheet is along an axial direction of the light-sheet microscope, the axial direction along an optical axis of the detection objective.

Embodiment 4. The method of embodiment 3, wherein adjusting the depth of field according to the measure of the excitation light-sheet includes adjusting the depth of field to be greater than an intrinsic depth of field of the detection objective but less than the measure of the thickness of the light-sheet.

Embodiment 5. The method of embodiment 3, wherein adjusting the depth of field according to the measure of the thickness of the excitation light sheet includes adjusting the depth of field equal to the measure of the thickness of the excitation light-sheet.

Embodiment 6. The method of embodiment 3, wherein adjusting the depth of field according to the measure of the thickness of the excitation light sheet includes adjusting the depth of field greater than the measure of the thickness of the excitation light-sheet.

Embodiment 7. The method of embodiment 3, wherein the measure of the thickness is a full width at half maximum intensity of the excitation light-sheet.

Embodiment 8. The method of embodiment 3, wherein the excitation light-sheet comprises a central lobe and one or more side lobes; and wherein measure of the thickness is based on a width of the central lobe in the axial direction.

Embodiment 9. The method of embodiment 8, wherein the measure of the thickness is further based on a side lobe width of at least one side lobe of the one or more side lobes.

Embodiment 10. The method of embodiment 9, further comprising acquiring more than one image in conjunction with varying a spatial pattern of the one or more side lobes of the light-sheet; and applying one or more image post-processing on the more than one acquired images.

Embodiment 11. The method of embodiment 10, wherein acquiring more than one image in conjunction with varying the spatial pattern of the one or more side lobes includes applying incoherent structured illumination to vary the spatial pattern of the one or more side lobes.

Embodiment 12. The method of embodiment 1, wherein adjusting the depth of field of the detection objective comprises adjusting at least one adaptive optical element positioned between the detection objective and the imaging sensor.

Embodiment 13. The method of embodiment 1, wherein adjusting the depth of field of the detection objective comprises selecting a static adaptive optical element among a plurality of static adaptive optical elements positioned between the detection objective and the imaging sensor.

Embodiment 14. The method of embodiment 13, wherein each of the plurality of static adaptive optical elements is an annular phase mask having a different number of concentric discs.

Embodiment 15. The method of embodiment 13, wherein the plurality of static adaptive optical elements includes a plurality of annular phase masks, a plurality of cubic phase masks, or a combination thereof.

Embodiment 16. The method of embodiment 13, wherein the depth of field is adjusted by utilizing one or more optical components to change a pupil aperture diameter to pass the fluorescence signal through a smaller or larger area of the static adaptive optical elements.

Embodiment 17. The method of embodiment 12, wherein the at least one adaptive optical element is a deformable mirror or a spatial light modulator.

Embodiment 18. The method of embodiment 1, further comprising: responsive to a request for axial scanning for volumetric imaging of the sample, performing the axial scanning while maintaining the adjusted depth of field.

Embodiment 19. The method of embodiment 18, wherein adjusting the depth of field of the detection objective comprises adjusting at least one adaptive optical element positioned between the detection objective and the imaging sensor; and wherein the axial scanning is performed via the at least one adaptive element or a second adaptive optical element.

Embodiment 20. A microscope system comprising: at least one illumination system for generating an excitation light-sheet and illuminating a sample with the excitation light-sheet; a detection objective positioned to receive photons generated at the sample by the excitation light-sheet; at least one adaptive optical elements for adjusting a depth of field of the detection objective; and a controller including executable instructions stored in non-transitory memory that when executed cause the controller to: adjust the depth of field of the detection objective, via the at least one adaptive optical element, according to a thickness of the excitation light-sheet.

Embodiment 21. The system of embodiment 20, wherein the at least one adaptive element is positioned between the detection objective and an imaging sensor receiving photon signals via the objective.

Embodiment 22. The system of embodiment 20, wherein the at least one adaptive optical element is positioned at or near a pupil plane of the objective.

Embodiment 23. The system of embodiment 21, further comprising one or more optical elements between the detection objective and the imaging sensor; and wherein the at least one adaptive optical element is positioned at or near a conjugate plane of a pupil plane of the detection objective or a respective conjugate plane of the one or more optical elements.

Embodiment 24. The system of embodiment 21, further comprising a static adaptive optical element positioned between the detection objective and the imaging sensor.

Embodiment 25. The system of embodiment 24, wherein the static adaptive optical element is an annular phase mask; and wherein the at least one adaptive optical element is a deformable mirror.

Embodiment 26. The system of embodiment 24, wherein the controller includes further instructions that when executed causes the controller to adjust the depth of field via the static adaptive optical element or the at least one adaptive optical element.

Embodiment 27. The system of embodiment 20, wherein adjust the depth of field of the objective comprises increasing a depth of field equal to or greater than the thickness of the excitation light-sheet; and wherein the thickness of the excitation light-sheet is a width of the excitation light-sheet in an axial direction, the axial direction along an optical axis of the objective.

Embodiment 28. The system of embodiment 27, wherein the thickness of the excitation light-sheet is determined according to a full width at half maximum intensity of the excitation light-sheet.

Embodiment 29. The system of embodiment 27, wherein the thickness of the excitation light-sheet is determined according to a type of illumination beam forming the light-sheet.

Embodiment 30. The system of embodiment 20, wherein adjust the depth of field of the objective comprises extending the depth of field equal to the thickness of the excitation light-sheet or extending the depth of field to a threshold width greater than the thickness of the excitation light-sheet; wherein the threshold width is based on a type of illumination beam forming the light-sheet.

Embodiment 31. A light-sheet microscope system comprising: at least one detection system including a detection objective, one or more optical elements, and one or more adaptive optical elements; at least one illumination system for generating an excitation light-sheet and illuminating a sample with the excitation light-sheet; and an imaging sensor for acquiring imaging data via the detection system; wherein the one or more adaptive optical elements are configured to adjust a depth of field of the objective according to a thickness of the excitation light-sheet.

Embodiment 32. The system of embodiment 31, further comprising a controller including executable instructions stored in non-transitory memory that when executed cause the controller to: during a first condition, when an image intensity is greater than a threshold intensity, receiving fluorescence signal from the sample with the objective at a first depth of field; and during a second condition, when the image intensity is less than the threshold intensity, increasing receiving fluorescence signal from the sample with the objective at a second depth of field, the second depth of field greater than the first depth of field.

Embodiment 33. The system of embodiment 32, wherein the first depth of field is an intrinsic depth of field of the objective; wherein the second depth of field is determined according to the thickness of the light-sheet and wherein the second depth of field is obtained by adjusting the one or more adaptive optical elements.

Embodiment 34. The system of embodiment 31, wherein the one or more adaptive optical elements is a dynamic optical element, a static adaptive optical element, or a combination thereof.

Embodiment 35. The system of embodiment 34, wherein the static adaptive optical element is an annular phase mask or a cubic phase mask; and wherein the adaptive optical element is a deformable mirror or a spatial light modulator.

Embodiment 36. The system of embodiment 31, wherein adjust the depth of field of the objective according to the thickness of the excitation light-sheet comprises extending the depth of field to be equal to or greater than the thickness of the excitation light-sheet.

Embodiment 37. The system of embodiment 31, wherein the one or more adaptive optical elements is positioned at or near a conjugate plane of the detection objective or at or near a respective conjugate plane of the one or more optical elements.

Embodiment 38. The system of embodiment 31, wherein the excitation light-sheet is dynamically changing its thickness, and the one or more adaptive optical elements are configured to adjust to a static depth of field that encompasses a full changing range of the light-sheet thickness.

Embodiment 39. The system of embodiment 31, wherein the excitation light-sheet is dynamically changing its thickness, and the one or more adaptive optical elements are configured to adjust to a dynamically changing depth of field, matching the changing thickness of the excitation light-sheet.

CONCLUSION

The various methods and techniques described above provide a number of ways to carry out the invention. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, the terms "a" and "an" and "the" and similar references used in the context of describing a particular embodiment of the application (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Certain embodiments of this application are described herein. Variations on those embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

The invention claimed is:

1. A method for obtaining and generating an image with a light-sheet microscope, comprising:
    illuminating a sample with an excitation light-sheet;
    adjusting a depth of field of a detection objective according to a measure of a thickness of the excitation light-sheet;
    receiving, at an imaging sensor, fluorescence signal from the sample via the detection objective; and
    generating the image of the sample according to the fluorescence signal.

2. The method of claim 1, further comprising adjusting the depth of field according to a type of an illumination beam forming the excitation light-sheet.

3. The method of claim 1, wherein the thickness of the excitation light- sheet is along an axial direction of the light-sheet microscope, the axial direction along an optical axis of the detection objective.

4. The method of claim 3, wherein adjusting the depth of field according to the measure of the excitation light-sheet includes adjusting the depth of field to be greater than an intrinsic depth of field of the detection objective but less than the measure of the thickness of the light-sheet, or wherein adjusting the depth of field according to the measure of the thickness of the excitation light sheet includes adjusting the depth of field equal to the measure of the thickness of the excitation light-sheet, or wherein adjusting the depth of field according to the measure of the thickness of the excitation light sheet includes adjusting the depth of field greater than the measure of the thickness of the excitation light-sheet.

5. The method of claim 3, wherein the measure of the thickness is a full width at half maximum intensity of the excitation light-sheet.

6. The method of claim 3, wherein the excitation light-sheet comprises a central lobe and one or more side lobes; and wherein measure of the thickness is based on a width of the central lobe in the axial direction.

7. The method of claim 6, wherein the measure of the thickness is further based on a side lobe width of at least one side lobe of the one or more side lobes.

8. The method of claim 7, further comprising acquiring more than one image in conjunction with varying a spatial pattern of the one or more side lobes of the light-sheet; and applying one or more image post-processing on the more than one acquired images.

9. The method of claim 8, wherein acquiring more than one image in conjunction with varying the spatial pattern of the one or more side lobes includes applying incoherent structured illumination to vary the spatial pattern of the one or more side lobes.

10. The method of claim 1, wherein adjusting the depth of field of the detection objective comprises adjusting at least one adaptive optical element positioned between the detection objective and the imaging sensor.

11. The method of claim 1, wherein adjusting the depth of field of the detection objective comprises selecting a static adaptive optical element among a plurality of static adaptive optical elements positioned between the detection objective and the imaging sensor.

12. The method of claim 11, wherein each of the plurality of static adaptive optical elements is an annular phase mask having a different number of concentric discs, or wherein the plurality of static adaptive optical elements includes a plurality of annular phase masks, a plurality of cubic phase masks, or a combination thereof.

13. The method of claim 11, wherein the depth of field is adjusted by utilizing one or more optical components to change a pupil aperture diameter to pass the fluorescence signal through a smaller or larger area of the static adaptive optical elements.

14. The method of claim 10, wherein the at least one adaptive optical element is a deformable mirror or a spatial light modulator.

15. The method of claim 1, further comprising:
responsive to a request for axial scanning for volumetric imaging of the sample, performing the axial scanning while maintaining the adjusted depth of field.

16. The method of claim 15, wherein adjusting the depth of field of the detection objective comprises adjusting at least one adaptive optical element positioned between the detection objective and the imaging sensor; and wherein the axial scanning is performed via the at least one adaptive element or a second adaptive optical element.

17. A microscope system comprising:
at least one illumination system for generating an excitation light-sheet and illuminating a sample with the excitation light-sheet;
a detection objective positioned to receive photons generated at the sample by the excitation light-sheet;
at least one adaptive optical elements for adjusting a depth of field of the detection objective; and
a controller including executable instructions stored in non-transitory memory that when executed cause the controller to:
adjust the depth of field of the detection objective, via the at least one adaptive optical element, according to a thickness of the excitation light-sheet.

18. The system of claim 17, wherein the at least one adaptive element is positioned between the detection objective and an imaging sensor receiving photon signals via the objective, or wherein the at least one adaptive optical element is positioned at or near a pupil plane of the objective.

19. The system of claim 18, further comprising one or more optical elements between the detection objective and the imaging sensor; and wherein the at least one adaptive optical element is positioned at or near a conjugate plane of a pupil plane of the detection objective or a respective conjugate plane of the one or more optical elements.

20. The system of claim 18, further comprising a static adaptive optical element positioned between the detection objective and the imaging sensor.

21. The system of claim 20, wherein the static adaptive optical element is an annular phase mask; and wherein the at least one adaptive optical element is a deformable mirror.

22. The system of claim 20, wherein the controller includes further instructions that when executed causes the controller to adjust the depth of field via the static adaptive optical element or the at least one adaptive optical element.

23. The system of claim 17, wherein adjust the depth of field of the objective comprises increasing a depth of field equal to or greater than the thickness of the excitation light-sheet; and wherein the thickness of the excitation light-sheet is a width of the excitation light-sheet in an axial direction, the axial direction along an optical axis of the objective.

24. The system of claim 23, wherein the thickness of the excitation light-sheet is determined according to a full width at half maximum intensity of the excitation light-sheet, or wherein the thickness of the excitation light-sheet is determined according to a type of illumination beam forming the light-sheet.

25. The system of claim 17, wherein adjust the depth of field of the objective comprises extending the depth of field equal to the thickness of the excitation light-sheet or extending the depth of field to a threshold width greater than the thickness of the excitation light-sheet; wherein the threshold width is based on a type of illumination beam forming the light-sheet.

26. A light-sheet microscope system comprising:
at least one detection system including a detection objective, one or more optical elements, and one or more adaptive optical elements;
at least one illumination system for generating an excitation light-sheet and illuminating a sample with the excitation light-sheet; and
an imaging sensor for acquiring imaging data via the detection system;
wherein the one or more adaptive optical elements are configured to adjust a depth of field of the objective according to a thickness of the excitation light-sheet.

27. The system of claim 26, further comprising a controller including executable instructions stored in non-transitory memory that when executed cause the controller to:
during a first condition, when an image intensity is greater than a threshold intensity, receiving fluorescence signal from the sample with the objective at a first depth of field; and
during a second condition, when the image intensity is less than the threshold intensity, increasing receiving fluorescence signal from the sample with the objective at a second depth of field, the second depth of field greater than the first depth of field.

28. The system of claim 27, wherein the first depth of field is an intrinsic depth of field of the objective; wherein the second depth of field is determined according to the thickness of the light-sheet and wherein the second depth of field is obtained by adjusting the one or more adaptive optical elements.

29. The system of claim 26, wherein the one or more adaptive optical elements is a dynamic optical element, a static adaptive optical element, or a combination thereof.

30. The system of claim 29, wherein the static adaptive optical element is an annular phase mask or a cubic phase mask; and wherein the adaptive optical element is a deformable mirror or a spatial light modulator.

31. The system of claim 26, wherein adjust the depth of field of the objective according to the thickness of the excitation light-sheet comprises extending the depth of field to be equal to or greater than the thickness of the excitation light-sheet.

32. The system of claim 26, wherein the one or more adaptive optical elements is positioned at or near a conjugate plane of the detection objective or at or near a respective conjugate plane of the one or more optical elements.

33. The system of claim 26, wherein the excitation light-sheet is dynamically changing its thickness, and the one or more adaptive optical elements are configured to adjust to a static depth of field that encompasses a full changing range of the light-sheet thickness, or wherein the excitation light-sheet is dynamically changing its thickness, and the one or more adaptive optical elements are configured to adjust to a dynamically changing depth of field, matching the changing thickness of the excitation light- sheet.

* * * * *